United States Patent
Sexton

(10) Patent No.: US 9,765,819 B1
(45) Date of Patent: Sep. 19, 2017

(54) BEARING ASSEMBLIES, APPARATUSES, AND MOTOR ASSEMBLIES USING THE SAME

(71) Applicant: US SYNTHETIC CORPORATION, Orem, UT (US)

(72) Inventor: Timothy N. Sexton, Bettendorf, IA (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 14/856,210

(22) Filed: Sep. 16, 2015

Related U.S. Application Data

(63) Continuation of application No. 13/736,474, filed on Jan. 8, 2013, now Pat. No. 9,163,660.

(51) Int. Cl.
| | |
|---|---|
| *F16C 33/04* | (2006.01) |
| *F16C 33/12* | (2006.01) |
| *E21B 4/00* | (2006.01) |
| *B23P 15/00* | (2006.01) |
| *F16C 33/26* | (2006.01) |

(52) U.S. Cl.
CPC .......... *F16C 33/121* (2013.01); *B23P 15/003* (2013.01); *E21B 4/003* (2013.01); *F16C 33/043* (2013.01); *F16C 33/26* (2013.01); *F16C 2352/00* (2013.01)

(58) Field of Classification Search
CPC ........ F16C 17/02; F16C 17/028; F16C 17/04; F16C 17/047; F16C 2206/00; F16C 2240/30; F16C 2352/00; F16C 33/26; F16C 33/121; F16C 33/043; E21B 10/22; E21B 4/003; B23P 15/003
See application file for complete search history.

(56) References Cited

U.S. PATENT DOCUMENTS

| | | | | |
|---|---|---|---|---|
| 4,560,014 A | * | 12/1985 | Geczy | E21B 4/003 175/107 |
| 4,597,456 A | * | 7/1986 | Ecer | B22F 7/06 175/371 |
| 4,708,496 A | * | 11/1987 | McPherson | E21B 4/003 228/122.1 |
| 4,756,631 A | * | 7/1988 | Jones | E21B 10/22 175/359 |
| 4,781,770 A | * | 11/1988 | Kar | B23K 26/34 148/220 |
| 5,165,804 A | | 11/1992 | Fisher et al. | |

(Continued)

OTHER PUBLICATIONS

U.S. Appl. No. 13/736,474, Oct. 2, 2015, Issue Notification.

(Continued)

*Primary Examiner* — Alan B Waits
(74) *Attorney, Agent, or Firm* — Dorsey & Whitney LLP

(57) ABSTRACT

Bearing assemblies, apparatuses, and motor assemblies using the same are disclosed. In an embodiment, a bearing assembly may include a plurality of superhard bearing elements distributed circumferentially about an axis. Each of the superhard bearing elements may include a bearing surface. The bearing assembly may also include a support ring structure having a support ring that carries the superhard bearing elements. The support ring structure may include at least one erosion resistant region exhibiting a higher erosion resistance than another region of the support ring.

18 Claims, 20 Drawing Sheets

(56) References Cited

U.S. PATENT DOCUMENTS

| | | | | |
|---|---|---|---|---|
| 5,364,192 A | * | 11/1994 | Damm | E21B 4/003 |
| | | | | 384/304 |
| 5,368,398 A | * | 11/1994 | Damm | E21B 4/003 |
| | | | | 384/304 |
| 5,498,081 A | * | 3/1996 | Dennis | E21B 4/003 |
| | | | | 175/107 |
| 6,474,424 B1 | * | 11/2002 | Saxman | E21B 10/22 |
| | | | | 175/367 |
| 7,552,782 B1 | | 6/2009 | Sexton et al. | |
| 7,866,418 B2 | | 1/2011 | Bertagnolli et al. | |
| 7,870,913 B1 | | 1/2011 | Sexton et al. | |
| 7,896,551 B2 | * | 3/2011 | Cooley | E21B 4/003 |
| | | | | 384/121 |
| 7,998,573 B2 | | 8/2011 | Qian et al. | |
| 8,034,136 B2 | | 10/2011 | Sani et al. | |
| 8,236,074 B1 | | 8/2012 | Bertagnolli et al. | |
| 8,496,075 B2 | * | 7/2013 | Scott | E21B 4/003 |
| | | | | 175/104 |
| 8,814,434 B1 | * | 8/2014 | Sexton | 384/282 |
| 2010/0218995 A1 | | 9/2010 | Sexton et al. | |
| 2011/0174544 A1 | | 7/2011 | Scott et al. | |

OTHER PUBLICATIONS

U.S. Appl. No. 13/736,474, filed Jan. 8, 2013, Sexton.
U.S. Appl. No. 13/736,474, May 5, 2014, Office Action.
U.S. Appl. No. 13/736,474, Aug. 21, 2014, Office Action.
U.S. Appl. No. 13/736,474, Oct. 29, 2014, Office Action.
U.S. Appl. No. 13/736,474, Dec. 5, 2014, Office Action.
U.S. Appl. No. 13/736,474, Apr. 8, 2015, Office Action.
U.S. Appl. No. 13/736,474, Jun. 15, 2015, Notice of Allowance.

* cited by examiner

BEARING ASSEMBLIES, APPARATUSES, AND MOTOR ASSEMBLIES USING THE SAME

CROSS-REFERENCE TO RELATED APPLICATIONS

This application is a continuation of U.S. application Ser. No. 13/736,474 filed on 8 Jan. 2013, the disclosure of which is incorporated herein, in its entirety, by this reference.

BACKGROUND

Subterranean drilling systems that employ downhole drilling motors are commonly used for drilling boreholes in the earth for oil and gas exploration and production. Such subterranean drilling systems typically include a downhole drilling motor that is operably connected to an output shaft. A pair of thrust-bearing apparatuses also can be operably coupled to the downhole drilling motor. A rotary drill bit configured to engage a subterranean formation and drill a borehole can be connected to the output shaft. As the borehole is drilled with the rotary drill bit, pipe sections may be connected to the subterranean drilling system to form a drill string capable of progressively drilling the borehole to a greater size or depth within the earth.

Each thrust-bearing apparatus includes a stator that does not rotate relative to the motor housing and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid may be circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The on-bottom and off-bottom thrust carried by the thrust-bearing apparatuses can also be extremely large and generate significant amounts of energy.

The operational lifetime of the bearing apparatuses often can determine the useful life of the subterranean drilling system. Therefore, manufacturers and users of bearing apparatuses continue to attempt to improve their operational lifetime.

SUMMARY

Various embodiments of the invention relate to bearing assemblies, apparatuses, and motor assemblies that include superhard bearing elements carried by a support ring structure that includes at least one erosion resistant region exhibiting a higher erosion resistant than another region of an underlying support ring. Such bearing assemblies may be employed in bearing apparatuses for use in downhole motors of a subterranean drilling system or other mechanical systems.

In an embodiment, a bearing assembly may include a plurality of superhard bearing elements distributed circumferentially about an axis. Each of the plurality of superhard bearing elements includes a superhard bearing surface. A support ring structure including a support ring carries the plurality of superhard bearing elements. The support ring structure further includes at least one erosion resistant region exhibiting a higher erosion resistance than another region of the support ring.

In an embodiment, a bearing apparatus may include a first bearing assembly including a plurality of superhard bearing elements distributed circumferentially about an axis. Each of the plurality of superhard bearing elements in the first bearing assembly includes a first superhard bearing surface. A support ring structure including a support ring carries the plurality of superhard bearing elements within the first bearing assembly. The support ring structure may include at least one erosion resistant region exhibiting a higher erosion resistance than another region of the support ring. The bearing apparatus also includes a second bearing assembly including a plurality of second superhard bearing elements, each of the second superhard bearing elements including a second superhard bearing surface oriented to engage the first superhard bearing surfaces of the first bearing assembly during operation of the bearing apparatus. The bearing apparatus also includes a second support ring that carries the plurality of second superhard bearing elements.

In an embodiment, a method of operating a bearing apparatus may include rotating a first bearing assembly relative to a second bearing assembly, wherein at least one of the first or second bearing assemblies includes a plurality of superhard bearing elements distributed circumferentially about an axis, with each of the plurality of superhard bearing elements including a superhard bearing surface. A support ring structure is provided, which includes a support ring that carries the plurality of superhard bearing elements. The support ring may include at least one erosion resistant region exhibiting a higher erosion resistance than another region of the support ring.

In an embodiment, a method of fabricating a bearing assembly may include providing a support ring and machining the support ring to include a plurality of recesses for receiving a plurality of superhard bearing elements. The plurality of recesses is distributed circumferentially about an axis. The method also includes depositing an erosion resistant coating onto at least a portion of a surface of the support ring between each of the plurality of recesses, and mounting each of the plurality of superhard bearing elements in a corresponding one of the plurality of recesses in the support ring.

Other embodiments include downhole motors for use in drilling systems and subterranean drilling systems that may utilize any of the disclosed bearing apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Various embodiments of the invention relate to bearing assemblies, apparatuses, and motor assemblies that include superhard bearing elements carried by a support ring structure that includes at least one erosion resistant region exhibiting a higher erosion resistance than another region of an underlying support ring. The disclosed bearing apparatuses, methods of using bearing apparatuses, and motor assemblies may be used in a variety of applications, such as drilling equipment, machining equipment, pumps, bearing apparatuses, and other articles.

Figure 1A:
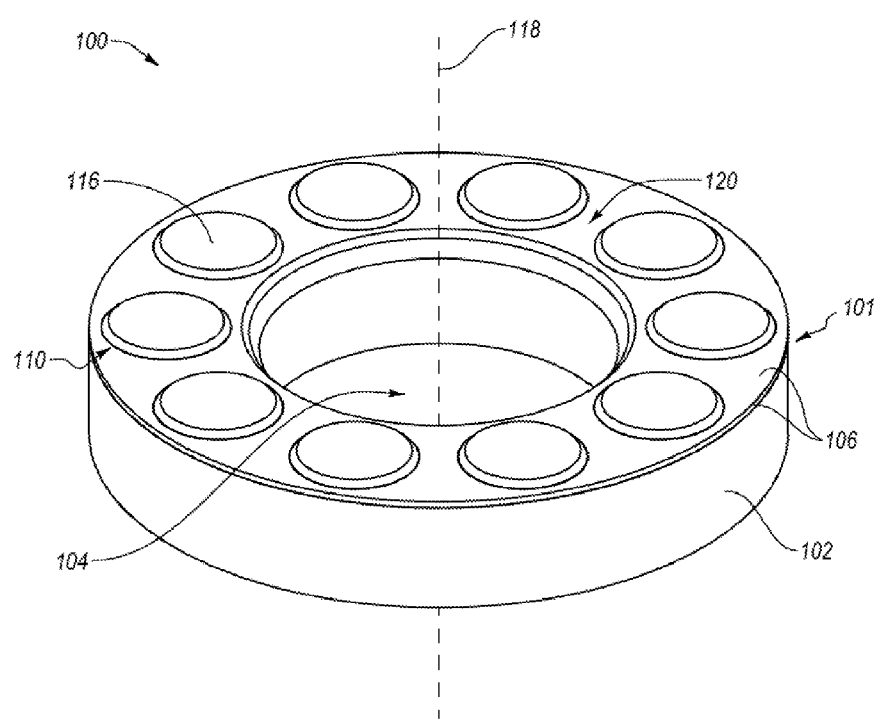
FIG. 1A is an isometric view of a thrust-bearing assembly according to an embodiment.
Figure 1B:
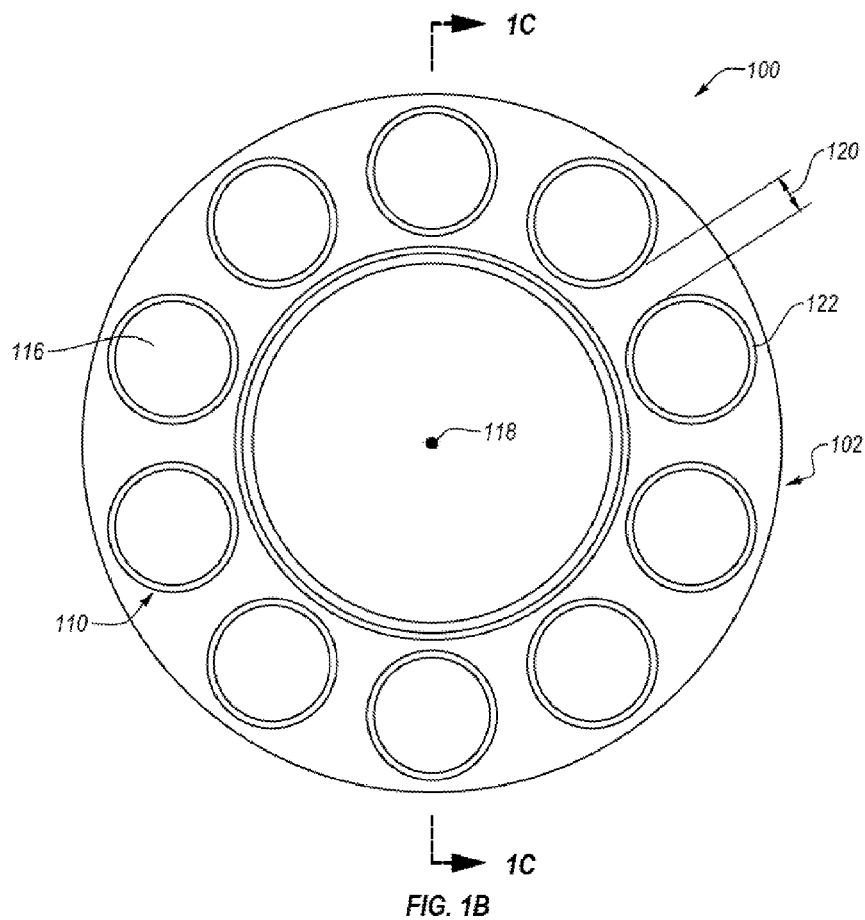
FIG. 1B is a top plan view of the thrust-bearing assembly shown in FIG. 1A.

FIGS. 1A and 1B are isometric and top plan views, respectively, of a thrust-bearing assembly 100 according to an embodiment. The thrust-bearing assembly 100 may form a stator or a rotor of a thrust-bearing apparatus used in a subterranean drilling system. The thrust-bearing assembly 100 may include a support ring structure 101 having a support ring 102 defining an opening 104 through which a shaft (not shown) of, for example, a downhole drilling motor may extend. The support ring 102 may be made from a variety of different materials. For example, the support ring 102 may comprise a metal, alloy steel, a metal alloy, carbon steel, stainless steel, tungsten carbide, combinations of the foregoing, or any other suitable metal or conductive or non-conductive material.

The support ring structure 101 further includes a plurality of erosion resistant regions including an erosion resistant coating 106 that at least partially covers one or more surfaces of the support ring 102. Such erosion resistant regions/coating 106 may provide erosion protection of the support ring 102 from abrasive drilling fluid/mud during operation of the thrust bearing assembly 100. The erosion resistant coating 106 may include an erosion resistant material exhibiting a higher erosion resistance than the support ring 102. For example, the erosion resistant coating 106 may comprise a carbide, a superhard material, a metal carbide (e.g., tungsten carbide, niobium carbide, molybdenum carbide, vanadium carbide, titanium carbide, or combinations thereof), a cemented carbide (e.g., tungsten carbide, niobium carbide, molybdenum carbide, silicon carbide, boron nitride, boron, carbide, vanadium carbide, titanium carbide, or combinations thereof cemented with cobalt, iron, nickel, or alloys thereof), diamond, boron nitride, combinations of the foregoing, or other suitable erosion resistant material. Any suitable test method for conducting erosion tests may be used. For example, American Society for Testing and Materials ("ASTM") has numerous standards that may be used for erosion testing of the erosion resistant coating 106.

The erosion resistant coating 106 may be laser-applied to the support ring 102; coated via chemical vapor deposition ("CVD") or variants thereof (e.g., plasma-enhanced CVD, etc., without limitation); may be pre-formed and secured to the support ring 102 via brazing, fastening with a fastener, welding (e.g., tungsten inert gas ("TIG") welding, manual metal arc welding, or plasma transferred arc ("PTA") welding), thermal spray welding, plasma spray welding, spray and fuse welding, oxy-acetylene welding, submerged arc welding, wire spray welding, manual torch welding, powder welding, flame spray welding, electrical arc welding, metal inert gas ("MIG") welding, or combinations of the foregoing; or may be applied by another suitable technique. For example, a commercially available CVD tungsten carbide layer (currently marketed under the trademark HARDIDE®) is available from Hardide Layers Inc. of Houston, Tex. In other embodiments, the erosion resistant coating 106 may be formed by physical vapor deposition ("PVD"), variants of PVD, high-velocity oxygen fuel ("HVOF") thermal spray processes, or any other suitable process, without limitation.

In other embodiments, hardfacing may be used to create a high-strength metallurgical bond between the support ring 102 and the erosion resistant coating 106, ensuring that the erosion resistant coating 106 does not flake off even under high mechanical loading. For example, for extreme demands on erosion resistance and bond strength, the erosion resistant coating 106 may be hardfaced onto the support ring 102 using TIG welding, manual metal arc welding, or PTA welding.

TIG welding involves drawing an arc between a non-consumable tungsten electrode and the support ring 102. The electrode, the arc, and the material from which the erosion resistant coating 106 is formed are protected from the atmosphere with an inert shielding gas. For manual welding, the material from which the erosion resistant coating 106 is formed may be provided in the form of a rod. The TIG process may also be mechanized. In such case a manipulator may be used to relatively move the support ring 102 in relation to the welding torch and the hardfacing wire or rod.

Manual metal arc welding involves drawing an arc between a consumable electrode and the support ring 102. The erosion resistant metallic core-wire may be melted by the arc and transferred to the weld-pool as molten drops. The melted electrode coating may form a gas shield around the arc and the weld pool as well as a slag on the surface of the weld-pool, thus shielding the cooling weld-pool from the atmosphere. Manual metal arc welding employs low cost equipment, has low operating costs, and the equipment relatively easy to transport.

PTA welding provides for ease of automation and a high degree of reproducibility of the welded erosion resistant coating 106. An advantage of the PTA process is that the powder form of the hardfacing materials may allow for the fabrication of the erosion resistant coating 106 from a variety of different materials and combinations of materials with a wide range of hardness and erosion resistant properties.

Figure 1C:
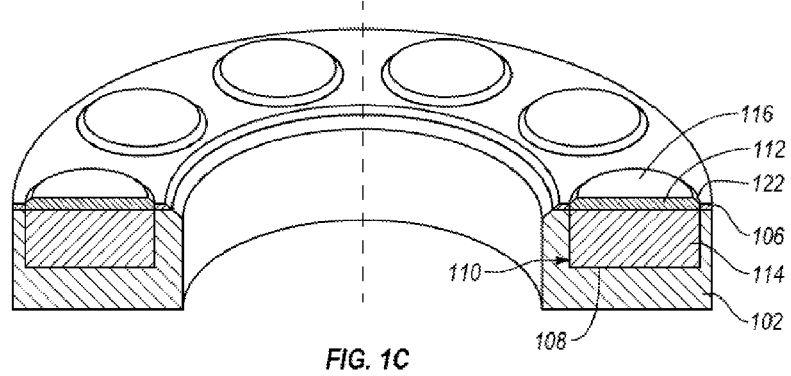
FIG. 1C is an isometric cutaway view taken along line 1C-1C of the thrust-bearing assembly shown in FIG. 1B.

The support ring 102 may include a plurality of recesses 108 (shown in FIG. 1C) formed therein, each of which receives a corresponding one of the superhard bearing elements 110. The superhard bearing elements 110 may include a superhard table 112 bonded to a substrate 114, with a superhard table 112 having and a bearing surface 116. In an embodiment, one or more of the superhard bearing elements 110 may have a generally cylindrical 3D shape. While the superhard bearing elements 110 are shown having a generally cylindrical shape, the one or more of the superhard bearing elements 110 may have any solid geometry, such as a generally cubic geometry, a generally polyhedron geometry, or any generally plane geometry that has a thickness or depth. For example, the bearing surface 116 of the superhard bearing element 110 may have a generally rectangular 2D shape, a generally oval shape, a generally wedge shape, a generally polygonal shape, or any other suitable geometry.

The superhard bearing elements 110 are illustrated in FIGS. 1A and 1B as being distributed circumferentially about a thrust axis 118 along which a thrust force may be generally directed during use. As shown, gaps 120 may be located between adjacent ones of the superhard bearing elements 110. In an embodiment, at least one of, some of, or all of the gaps 120 may exhibit a width of about 0.00020 inches to 0.500 inches, such as about 0.10 inches to about 0.3 inches, about 0.10 inches to about 0.4 inches, about 0.00040 inches to 0.0010 inches, or about 0.00040 inches to 0.080 inches. In other embodiments, the gaps 120 may have widths that are relatively larger or smaller. In other embodiments, the gaps 120 may vary between different adjacent ones of the superhard bearing elements 110.

Each of the superhard bearing elements 110 may be partially disposed within a corresponding one of the plurality of recesses 108 of the support ring 102 and secured partially therein via brazing, press-fitting, threadly attaching, fastening with a fastener, combinations of the foregoing, or another suitable technique. The superhard bearing elements 110 may be pre-machined to tolerances and mounted in the support ring 102 and the erosion resistant coating 106 and/or mounted to the support ring 102 and the erosion resistant coating 106 and the bearing surfaces 116 thereof and planarized (e.g., by lapping and/or grinding) so that the bearing surfaces 116 are substantially coplanar. Optionally, one or more of the superhard bearing elements 110 may exhibit a peripherally extending edge chamfer 122, shown in FIGS. 1B and 1C. However, in other embodiments, the edge chamfer may be omitted.

In an embodiment, the erosion resistant coating 106 may be deposited only on areas of the support ring 102 prone to erosion from abrasive drilling fluid/mud during operation of the thrust bearing assembly 100. For example, the erosion resistant coating 106 may be deposited only between the superhard bearing elements 110.

In an embodiment, the superhard bearing elements 110 may be mounted to the support ring structure 101 following deposition of the erosion resistant coating 106 onto at least a portion of a surface of the support ring 102. In some embodiments, the erosion resistant coating 106 may even coat side and bottom surfaces of the recesses 108, while in other embodiments the side and bottom surfaces of the recesses may not be coated.

In another embodiment, the superhard bearing elements 110 may be mounted to the support ring structure 101 prior to deposition of the erosion resistant coating 106 onto at least a portion of a surface of the support ring 102.

In an embodiment, the erosion resistant coating 106 may be machined following deposition on the support ring structure 104 and prior to attachment or mounting of each of the superhard bearing elements 110 into a corresponding one of the plurality of recesses 108. In other embodiments, the erosion resistant coating 106 may be machined following deposition and after attachment or mounting of each of the superhard bearing elements 110 into a corresponding one of the plurality of recesses 108. For example, the erosion resistant coating 106 may be machined on the support ring structure 101 using milling machines, saws, grinding machines, electrical discharge machining ("EDM"), electro-chemical erosion, laser cutting, or water jet cutting to shape the erosion resistant coating. The machining may include drilling, turning, boring, milling, laser cutting, diamond wire cutting, and wire EDM.

As used herein, a "superhard bearing element" is a bearing element including a bearing surface that is made from a material exhibiting a hardness that is at least as hard as tungsten carbide. In any of the embodiments disclosed herein, the superhard bearing elements may comprise one or more superhard materials, such as polycrystalline diamond, polycrystalline cubic boron nitride, silicon carbide, tungsten carbide, or any combination of the foregoing superhard materials. For example, the superhard table 112 may comprise polycrystalline diamond and the substrate 114 may comprise cobalt-cemented tungsten carbide. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials and/or structures from which the superhard bearing elements can be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate the superhard table 208 in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 70 μm, 60 μm, 50 μm, 40 μm, 30 μm, 20 μm, 15 μm, 12 μm, 10 μm, 8 μm) and another portion exhibiting at least one relatively smaller size (e.g., 15 μm, 12 μm, 10 μm, 8 μm, 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In another embodiment, the diamond particles may include a portion exhibiting the relatively larger size between about 15 μm and about 50 μm and another portion exhibiting the relatively smaller size between about 5 μm and about 15 μm. In another embodiment, the relatively larger size diamond particles may have a ratio to the relatively smaller size diamond particles of at least 1.5. In some embodiments, the diamond particles may comprise three or more different sizes (e.g., one relatively larger size and two or more relatively smaller sizes), without limitation. The resulting polycrystalline diamond formed from HPHT sintering the aforementioned diamond particles may also exhibit the same or similar diamond grain size distributions and/or sizes as the aforementioned diamond particle distributions and particle sizes. Additionally, in any of the embodiments disclosed herein, the superhard bearing elements may be free-standing (e.g., substrateless) and formed from a polycrystalline diamond body that is at least partially or fully leached to remove a metal-solvent catalyst initially used to sinter the polycrystalline diamond body.

Figure 2A:
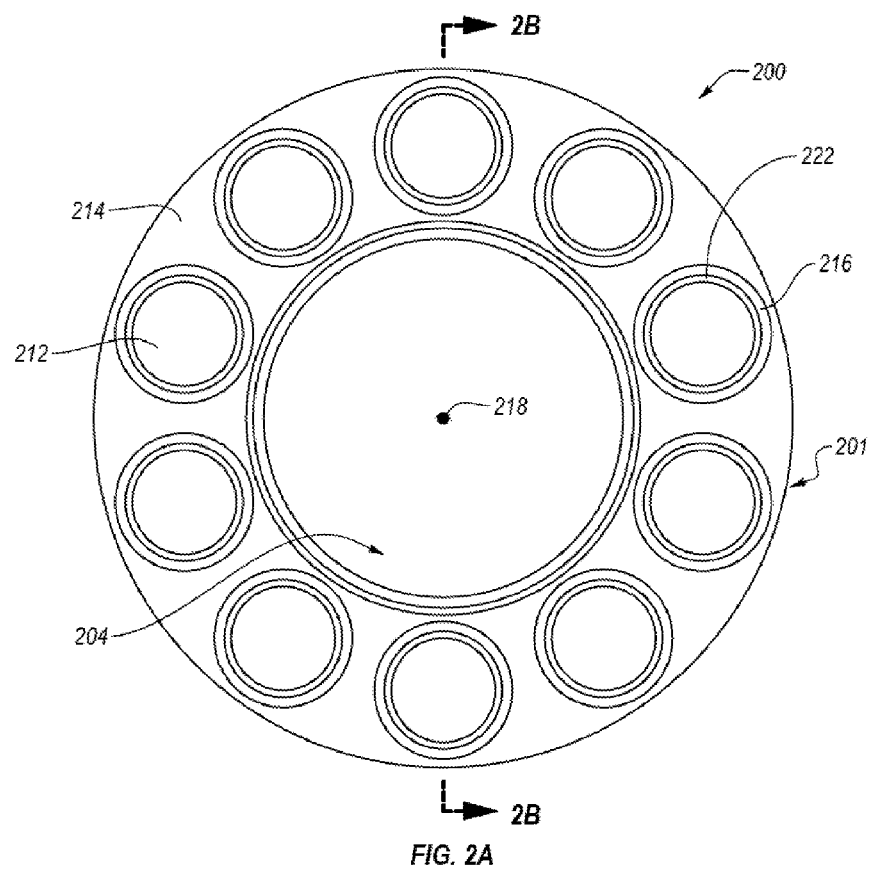
FIG. 2A is a top plan view of a thrust-bearing assembly according to an embodiment.
Figure 2B:
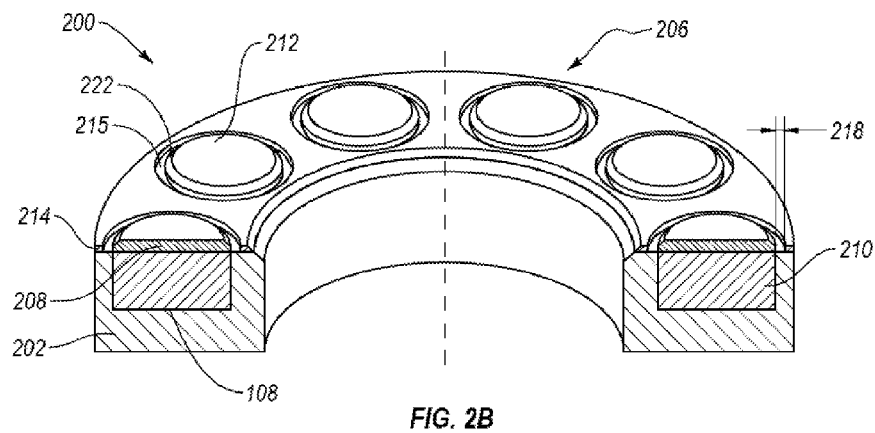
FIG. 2B is an isometric cutaway view taken along line 2B-2B of the thrust-bearing assembly shown in FIG. 2A.

FIGS. 2A and 2B are top plan and isometric cutaway views of a thrust-bearing assembly 200 according to an embodiment. The thrust-bearing assembly 200 may form a stator or a rotor of a thrust-bearing apparatus. The thrust-bearing assembly 200 may include a support ring structure 201 having a support ring 202 defining an opening 204 through which a shaft (not shown) of, for example, a downhole drilling motor may extend. Similar to the support ring 102, the support ring 202 may be made from a variety of different materials. For example, the support ring 202 may comprise a metal, an alloy steel, a metal alloy, carbon steel, a stainless steel, tungsten carbide, combinations of the foregoing, or any other suitable conductive or non-conductive material.

The thrust-bearing assembly 200 may include a plurality of superhard bearing elements 206. The superhard bearing elements 206 may include a superhard table 208 bonded to a substrate 210, with the superhard table 208 including a bearing surface 212. Each of the plurality of superhard bearing elements 206 may comprise a superhard compact or any other superhard material or structure disclosed herein. In an embodiment, one or more of the superhard bearing elements 206 may have a general cylindrical 3D shape. While the superhard bearing elements 206 are shown having a generally cylindrical shape, each of the plurality of superhard bearing elements 206 may have any solid geometry such as a generally cubic geometry, a generally polyhedron geometry, or any generally plane geometry that has a thickness or depth. For example, one or more of the superhard bearing elements 206 may have a general rectangular shape, a general oval shape, or any other suitable geometry.

The thrust-bearing assembly 200 (as shown in FIGS. 2A and 2B) may have each of the superhard bearing elements 206 attached to the support ring 202 prior to the coating of the support ring 202 with the erosion resistant coating 214. For example, following attachment of each of the superhard bearing elements 206 to the support ring 202, protective cups may be positioned over each of the superhard bearing elements 206 prior to deposition of the erosion resistant coating 214. Such protective cups may serve to protect and/or cool each of the superhard bearing elements 206 during the erosion resistant coating deposition process.

Following deposition of the erosion resistant coating 214, the protective cups may be removed from each of the superhard bearing elements 206. A gap 216 surrounding each of the superhard bearing elements 206 may result from the presence of the protective cup during processing. As shown in FIGS. 2A and 2B, gaps 216 may be located between the superhard bearing elements 206 and the erosion resistant coating 214. In an embodiment, at least one of, some of, or all of the gaps 216 may exhibit a width 218 (as shown in FIG. 2B) of about 0.00020 inches to 0.25 inches, such as about 0.050 inches to about 0.1 inches, about 0.10 inches to about 0.2 inches, about 0.00040 inches to 0.0010 inches, or about 0.00040 inches to 0.080 inches. In other embodiments, the gaps 216 may have widths 218 that are relatively larger or smaller. In other embodiments, the gaps 216 may vary between different adjacent ones of the superhard bearing elements 206.

Figure 3A:
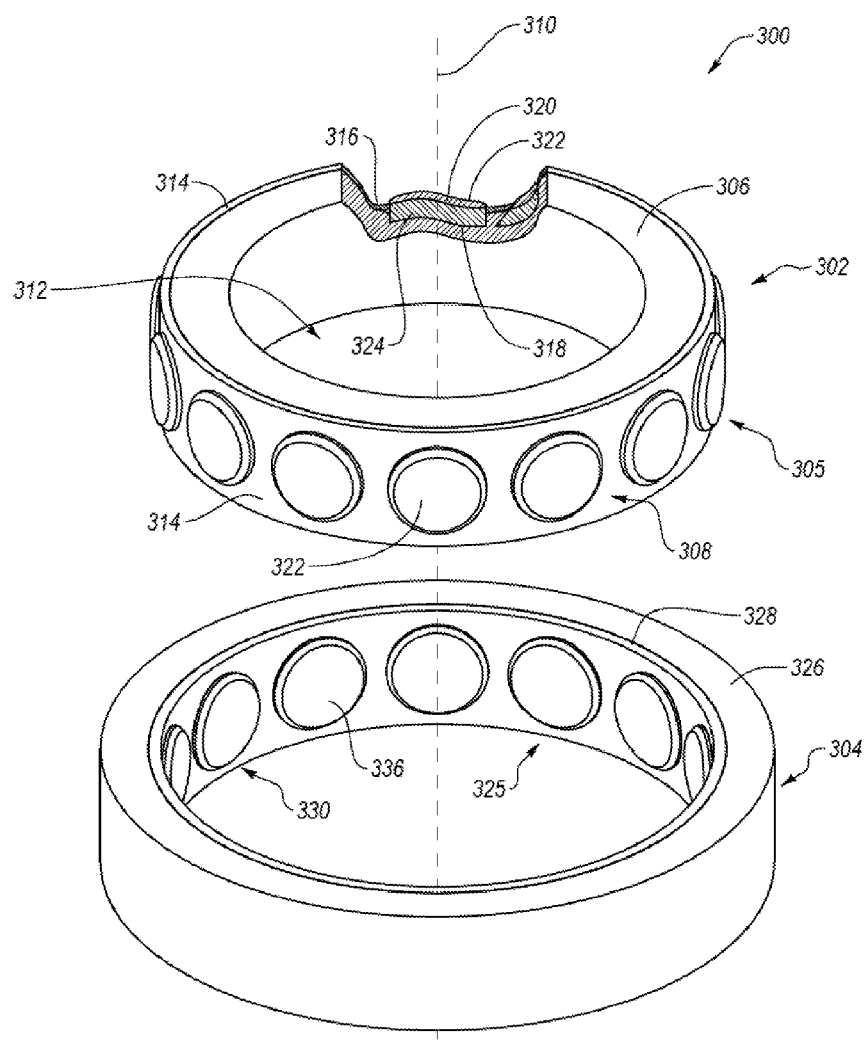
FIG. 3A is an exploded isometric cutaway view of a radial bearing apparatus according to an embodiment.
Figure 3B:
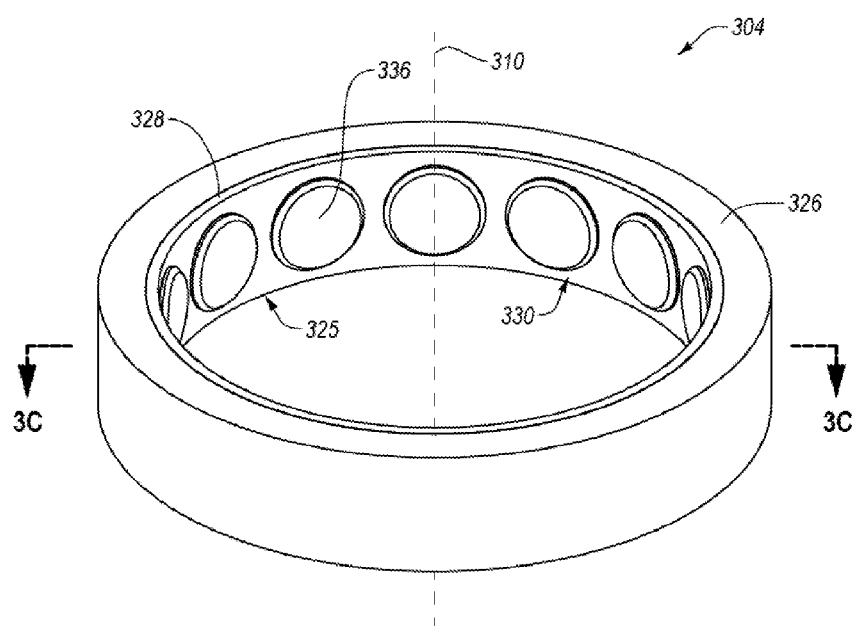
FIG. 3B is an isometric view of the outer radial bearing assembly shown in FIG. 3A.
Figure 3C:
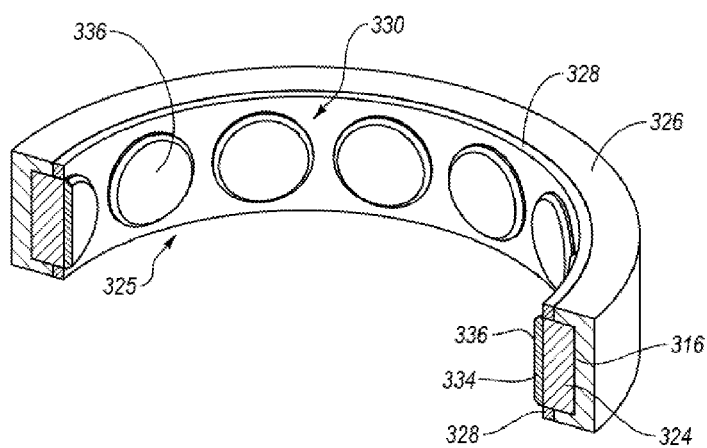
FIG. 3C is an isometric cutaway view of the outer radial bearing assembly taken along line 3C-3C of the radial bearing assembly shown in FIGS. 3A and 3B.

The concepts used in the thrust-bearing assemblies and apparatuses described above may also be employed in radial bearing assemblies and apparatuses. For example, FIGS. 3A-3C are exploded, isometric, and isometric cutaway views, respectively, of a radial bearing apparatus 300 according to an embodiment. The radial bearing apparatus 300 may include a first radial bearing assembly 302 (i.e., an inner race) and a second radial bearing assembly 304 (i.e., an outer race). The first radial bearing assembly 302 may be configured as a rotor and may include a support ring structure 305 including a support ring 306 and a plurality of superhard bearing elements 308 extending about a rotation axis 310. The support ring 306 may include an inner peripheral surface defining a central opening 312.

As shown in FIG. 3A, the support ring structure 305 includes the support ring 306 and an erosion resistant coating 314 disposed thereon that may enhance the erosion resistance of the support ring 306. Much like the erosion resistant coating 106, the erosion resistant coating 314 may comprise a carbide, a superhard material, a metal carbide (e.g., tungsten carbide, niobium carbide, molybdenum carbide, vanadium carbide, titanium carbide, or combinations thereof), a cemented carbide (e.g., tungsten carbide, niobium carbide, molybdenum carbide, boron carbide, silicon carbide, vanadium carbide, titanium carbide, or combinations thereof cemented with cobalt, iron, nickel, or alloys thereof), diamond, boron nitride, combinations of the foregoing, or other suitable erosion resistant material. The erosion resistant coating 314 may be applied to the support ring 306 using any of the methods disclosed herein.

As illustrated in FIG. 3A, the superhard bearing elements 308 may be distributed circumferentially about a rotation axis 310 in a plurality of corresponding recesses 318 formed in the support ring 306 of the support ring structure 305 and arranged in a single row. In other embodiments, the superhard bearing elements 308 may be circumferentially distributed in two rows, three rows, four rows, or any other number of rows. At least one, some of, or each superhard bearing element 308 may include a superhard table 320 (shown in FIG. 3A) including a convexly-curved bearing surface 322 (e.g., curved to lie on an imaginary cylindrical surface). Each superhard table 320 may be bonded or attached to a corresponding substrate 324. The superhard bearing elements 308 may have a generally cylindrical shape and may be made from any of the materials discussed above for the superhard bearing elements 110, or 206. In other embodiments, the superhard bearing elements 308 may have different shapes and/or sizes. For example, one or more of the superhard bearing surfaces 322 may have any solid geometry such as a generally cubic geometry, or a generally polyhedron geometry, or any generally plane geometry that has a thickness or depth. For example, a bearing surface of a superhard bearing element may have a generally rectangular shape, a generally elliptical shape, a generally wedge shape, a generally polygonal shape, a generally oval shape, or any other suitable geometry, and/or at least one of the superhard bearing elements 308 may be sized larger than another one of the superhard bearing elements 308.

The second radial bearing assembly 304 may be configured as a stator that extends about and receives the first radial bearing assembly 302 (i.e., rotor). The second radial bearing assembly 304 may be generally configured similar to the first radial bearing assembly 302 or any other radial bearing assembly disclosed herein. For example, the second radial bearing assembly 304 may include a support ring structure 325 comprising a support ring 326 including an erosion resistant coating 328 (FIG. 3C) formed from any of the materials disclosed herein for the erosion resistant coating 314, and a plurality of superhard bearing elements 330.

The erosion resistant coating 328 may provide erosion resistance regions laterally surrounding each of the superhard bearing elements 330. The superhard bearing elements 330 may be machined to tolerances and mounted in the support ring 326 and/or attached to the support ring 326 of the support ring structure 325 according to any of the embodiments disclosed herein.

At least one of, some of, or each superhard bearing element 330 may include a superhard table 334 (shown in FIG. 3C) including a concavely-curved bearing surface 336 curved to correspond to the convexly-curved bearing surfaces 322 of the superhard bearing elements 308. Each of the superhard bearing elements 330 including the concavely curved bearing surface 336 may be oriented to engage the convexly-curved bearing surfaces 322 of the first bearing assembly 302 during operation. Similar to the superhard bearing elements 308, the superhard bearing elements 330 may have a general cylindrical shape and may be made from any of the materials and structures discussed above for any superhard bearing elements disclosed herein.

While the superhard bearing elements 330 are shown configured similarly to one another and the superhard bearing elements 308, in other embodiments, the superhard bearing elements 330 may have any solid geometry such as a generally cubic geometry, a generally polyhedron geometry, or any generally plane geometry that has a thickness or depth. For example, the bearing surface 336 of the superhard bearing element 330 may have a generally rectangular shape, a generally elliptical shape, a generally wedge shape, a generally polygonal shape, a generally oval shape, or any other suitable geometry. In other embodiments, at least one of the superhard bearing elements 308 may have a generally rectangular shape and at least one of the superhard bearing 330 elements may have a generally elliptical shape. In yet other embodiments, at least one of the superhard bearing elements 330 may be sized larger than at least one of the superhard bearing elements 308.

In an embodiment, a shaft or spindle (not shown) may extend through the opening 312 and may be secured to the first radial bearing assembly 302, threadly coupling the shaft or spindle to the first radial bearing assembly 302, or another suitable technique. A housing (not shown) may also be secured to the second radial bearing assembly 304 using similar techniques. While the first radial bearing assembly 302 is shown configured as the rotor and the second radial bearing assembly 304 is shown configured as the stator, in other embodiments, the first radial bearing assembly 302 may be configured as the stator and the second radial bearing assembly 304 may be configured as the rotor.

Figure 4A:
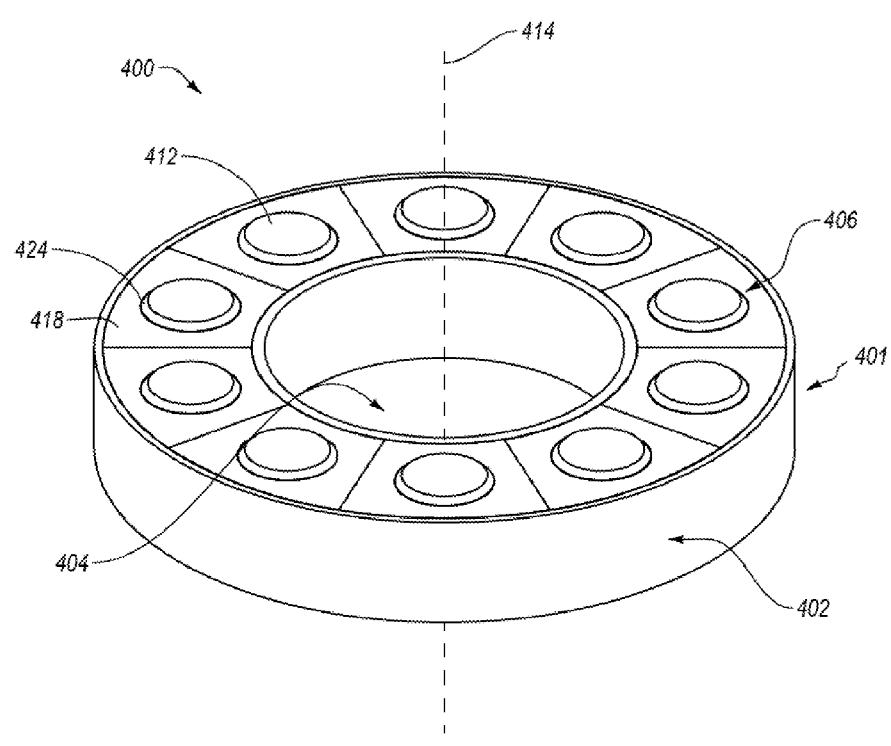
FIG. 4A is an isometric view of a thrust-bearing assembly according to an embodiment.
Figure 4B:
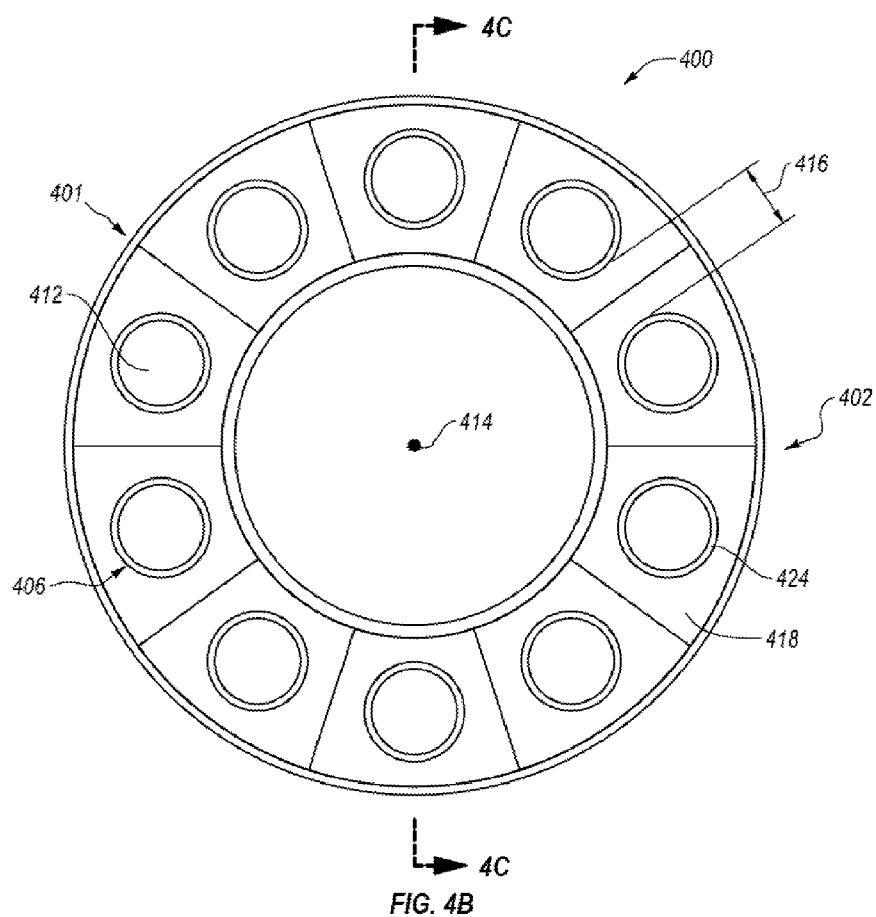
FIG. 4B is a top plan view of the thrust-bearing assembly shown in FIG. 4A according to an embodiment.

FIGS. 4A and 4B are isometric and top plan views of a thrust-bearing assembly 400 according to an embodiment. The thrust-bearing assembly 400 may form a stator or a rotor of a thrust-bearing apparatus. The thrust-bearing assembly 400 may include a support ring structure 401 having a support ring 402 defining an opening 404 through which a shaft (not shown) of, for example, a downhole drilling motor may extend. Similar to the support ring 102, the support ring 402 may be made from a variety of different materials. For example, the support ring 402 may comprise a metal, an alloy steel, a metal alloy, carbon steel, a stainless steel, tungsten carbide, combinations of the foregoing, or any other suitable conductive or non-conductive material.

The superhard bearing elements 406 are illustrated in FIGS. 4A and 4B being distributed circumferentially about a thrust axis 414 along which a thrust force may be generally directed during use. As shown in FIG. 4B, gaps 416 may be located between adjacent ones of the superhard bearing elements 406. In an embodiment, at least one of, some of, or all of the gaps 416 may exhibit width of about 0.00020 inches to 0.500 inches, such as about 0.10 inches to about 0.3 inches, about 0.10 inches to about 0.4 inches, about 0.00040 inches to 0.0010 inches, or about 0.00040 inches to 0.080 inches. In other embodiments, the gaps 416 may have widths that are relatively larger or smaller. In other embodiments, one or more of the gaps 416 may have different widths. For example, one pair of adjacent ones of the superhard bearing elements 406 may be closer together than another pair of adjacent ones of the superhard bearing elements 406.

Figure 4C:
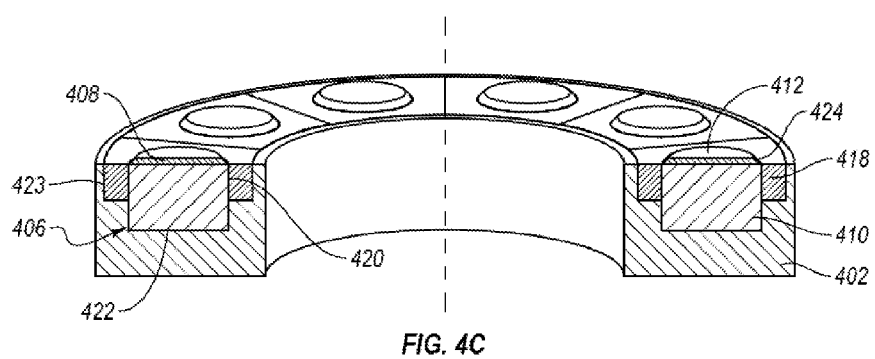
FIG. 4C is an isometric cutaway view taken along line 4C-4C of the thrust bearing assembly shown in FIG. 4B.
Figure 4D:
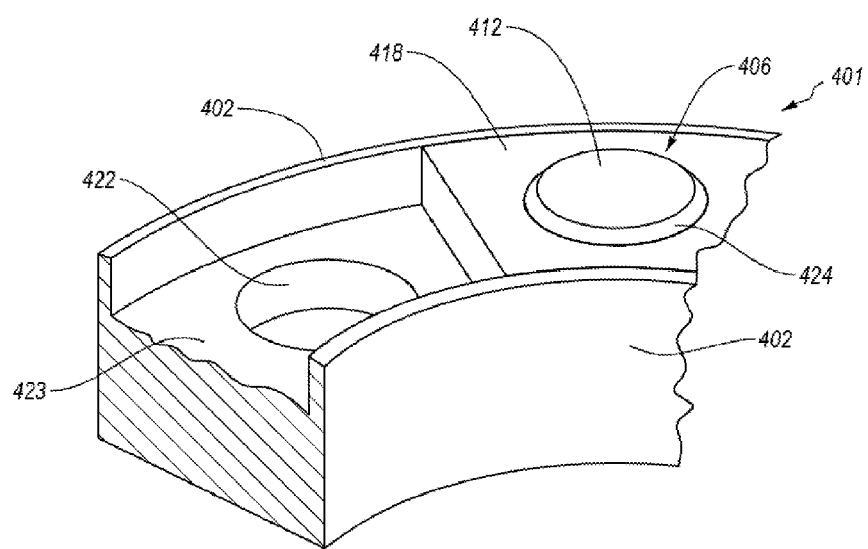
FIG. 4D is a partial isometric cutaway view of the thrust-bearing assembly shown in FIGS. 4A-4C according to an embodiment.

As shown in FIGS. 4C and 4D, the support ring 402 may include an annular slot 423 having a plurality of recesses 422 formed in a base surface thereof. Each of the superhard bearing elements 406 may be disposed in a corresponding one of the plurality of recesses 422 and project from the annular slot 423.

Increased erosion resistance in lateral regions surrounding each of the plurality of superhard bearing elements 406 may provide for increased erosion resistance of the support ring 402. Abrasive-laden fluids may cause erosion of the support ring 402, which carries the plurality of superhard bearing elements 406. This erosion may be caused by contact from abrasive particles suspended in fluid during operation. Erosion of areas between and in close proximity to the plurality of superhard bearing elements 406 may result in erosion of the support ring 402 between the superhard bearing elements 406, which may be undesirable.

To provide for increased erosion resistance of the bearing assembly 400, the support ring structure 401 further includes a plurality of erosion resistant regions exhibiting a higher erosion resistance than the support ring 402 and disposed between adjacent superhard bearing elements 406 of the plurality of superhard bearing elements 406. For example, as shown in FIG. 4D, the support ring 402 may be configured to carry a plurality of inserts 418 that each functions as an erosion resistant region. Each of the plurality of inserts 418 may extend at least partially laterally about a corresponding one of the plurality of superhard bearing elements 406. For example, in the illustrated embodiment, each of the plurality of inserts 418 extends peripherally completely about one of the superhard bearing elements 406. Each of the plurality of inserts 418 may comprise an erosion resistant material exhibiting a higher erosion resistance than the support ring 402. For example, the plurality of inserts 418 may comprise a carbide, a superhard material, a metal carbide (e.g., tungsten carbide, niobium carbide, molybdenum carbide, vanadium carbide, titanium carbide, or combinations thereof), a cemented carbide (e.g., tungsten carbide, niobium carbide, molybdenum carbide, boron carbide, silicon carbide, vanadium carbide, titanium carbide, or combinations thereof cemented with cobalt, iron, nickel, or alloys thereof), diamond, boron nitride, combinations of the foregoing, or other suitable erosion resistant material. The plurality of inserts 418 may be pre-machined to tolerances and mounted to the support ring 402 via brazing, interference-fitted, press-fitting, threadly attaching, fastening with a fastener, combinations of the foregoing, or another suitable technique.

Figure 4E:
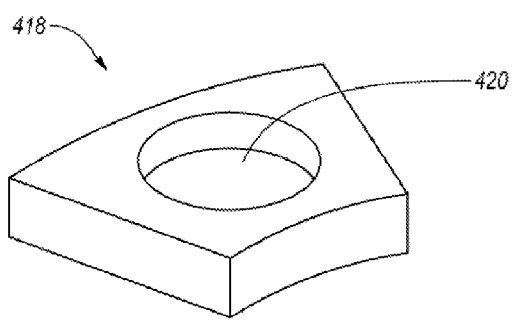
FIG. 4E is an isometric view of one of the inserts shown in FIGS. 4A-4D, according to an embodiment.

The annular slot 423 receives the plurality of inserts 418 and each of the plurality of inserts 418 receives a corresponding one of the plurality of superhard bearing elements 406. Each of the plurality of inserts 418 may include a hole 420 therein (shown in FIG. 4E) through which a corresponding one of the superhard bearing elements 406 projects. The positioning of the superhard bearing elements 406 into the holes 420 of the inserts 418 provides for erosion resistant regions surrounding each of the superhard bearing elements 406.

Similar to the superhard bearing elements 110, the superhard bearing elements 406 may be machined to tolerances and mounted in the holes 420 of the inserts 418 and the support ring 402. Bearing surfaces 412 may be planarized (e.g., by lapping and/or grinding) and/or positioned so that the bearing surfaces 412 are substantially coplanar with each other. Optionally, one or more of the superhard bearing elements 406 may exhibit a peripherally extending edge chamfer 424 (shown in FIG. 4B-4D). However, in other embodiments, the edge chamfer 424 may be omitted or may extend partially along one or more selected portions of the periphery of bearing surface 412.

Embodiments of the invention may include inserts of varying suitable shapes and configurations. For example, a cross-sectional shape of the inserts may exhibit a round, square, polygonal, oval, rectangular, or other suitable shape that may include a hole or recess for receiving at least a portion of a superhard bearing element. FIGS. 5A, 5B, 6A and 6B illustrate two embodiments each with a varied shape of insert for receiving superhard bearing elements 510 and 610.

Figure 5A:
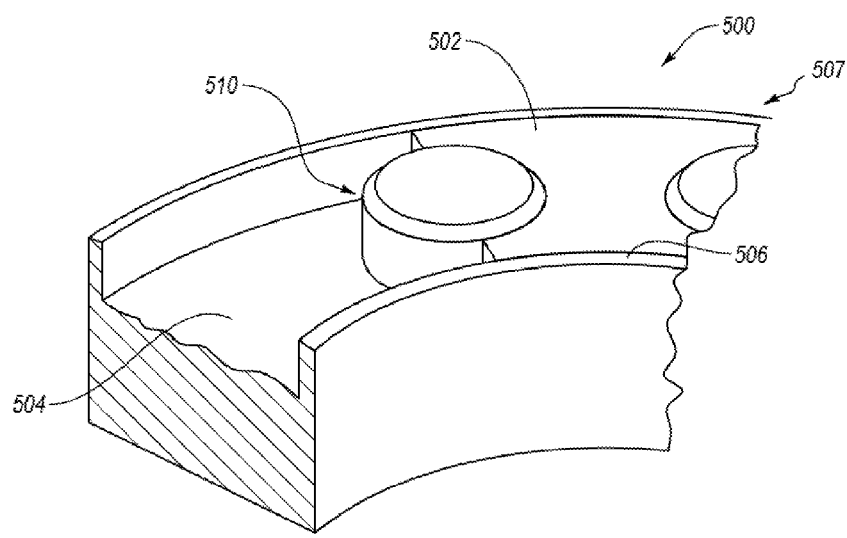
FIG. 5A is a partial isometric cutaway view of a thrust-bearing assembly according to an embodiment.
Figure 5B:
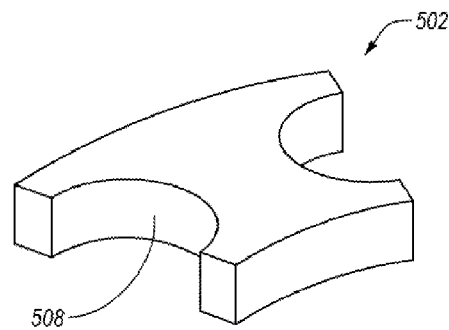
FIG. 5B is an isometric view of an insert of the thrust-bearing assembly shown in FIG. 5A according to an embodiment.

FIGS. 5A and 5B are isometric views of a thrust-bearing assembly 500 and an insert 502, respectively, according to one or more embodiments. The plurality of inserts 502 shown in FIGS. 5A and 5B may each be received by an annular slot 504 formed within a support ring 506 to define a support ring structure 507. The plurality of inserts 502 may be generally rectangular shaped and include two semi-circular recesses 508 (e.g., cutouts) on opposite sides of the insert 502, as shown in FIG. 5B. Each of the recesses 508 is configured to receive a portion of superhard bearing element 510 such that one superhard bearing element 510 is positioned with a recess 508 on each side of the superhard bearing element 510, as shown in FIG. 5A. Such a configuration may provide a substantially continuous erosion resistant region surrounding a periphery of each of the plurality of superhard bearing elements 510.

Figure 6A:
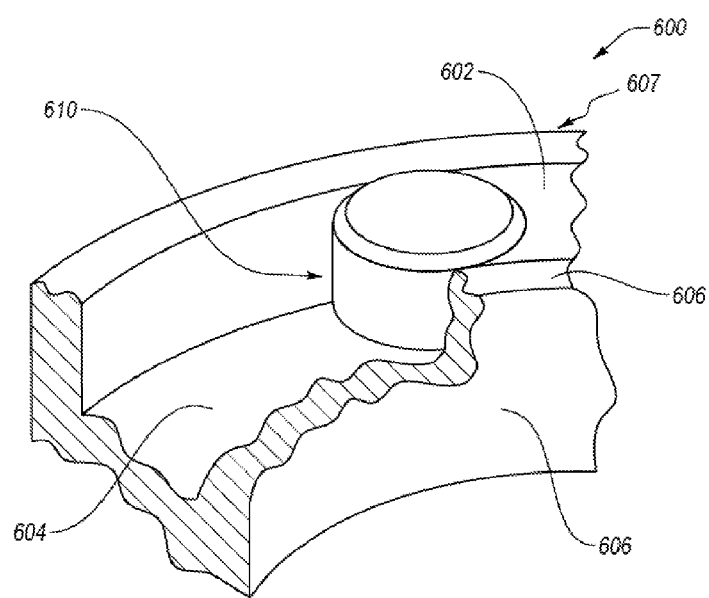
FIG. 6A is a partial isometric cutaway view of a thrust-bearing assembly according to an embodiment.
Figure 6B:
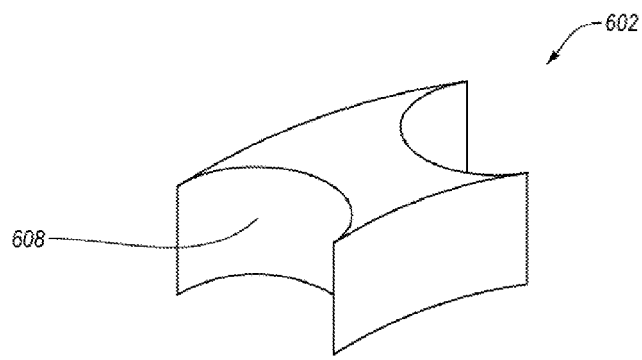
FIG. 6B is an isometric view of an insert of the thrust-bearing assembly shown in FIG. 6A according to an embodiment.

FIGS. 6A and 6B are isometric views of a thrust-bearing assembly 600 and an insert 602, respectively, according to one or more embodiments. Each of the plurality of inserts 602 shown in FIGS. 6A and 6B may be received by an annular slot 604 formed within a support ring 606 to define a support ring structure 607. Each of the plurality of inserts 602 may be generally rectangular shaped and include two arcuate recesses 608 on opposite sides of the insert 602. Similar to the inserts 502 and semi-circular recesses 508 of FIGS. 5A and 5B, each of the recesses 608 is configured to receive a superhard bearing element 610 such that one of the superhard bearing elements 610 is positioned with recesses 608 on each side thereof for providing an erosion resistant region surrounding a periphery of each of the plurality of superhard bearing elements 610.

Figure 7A:
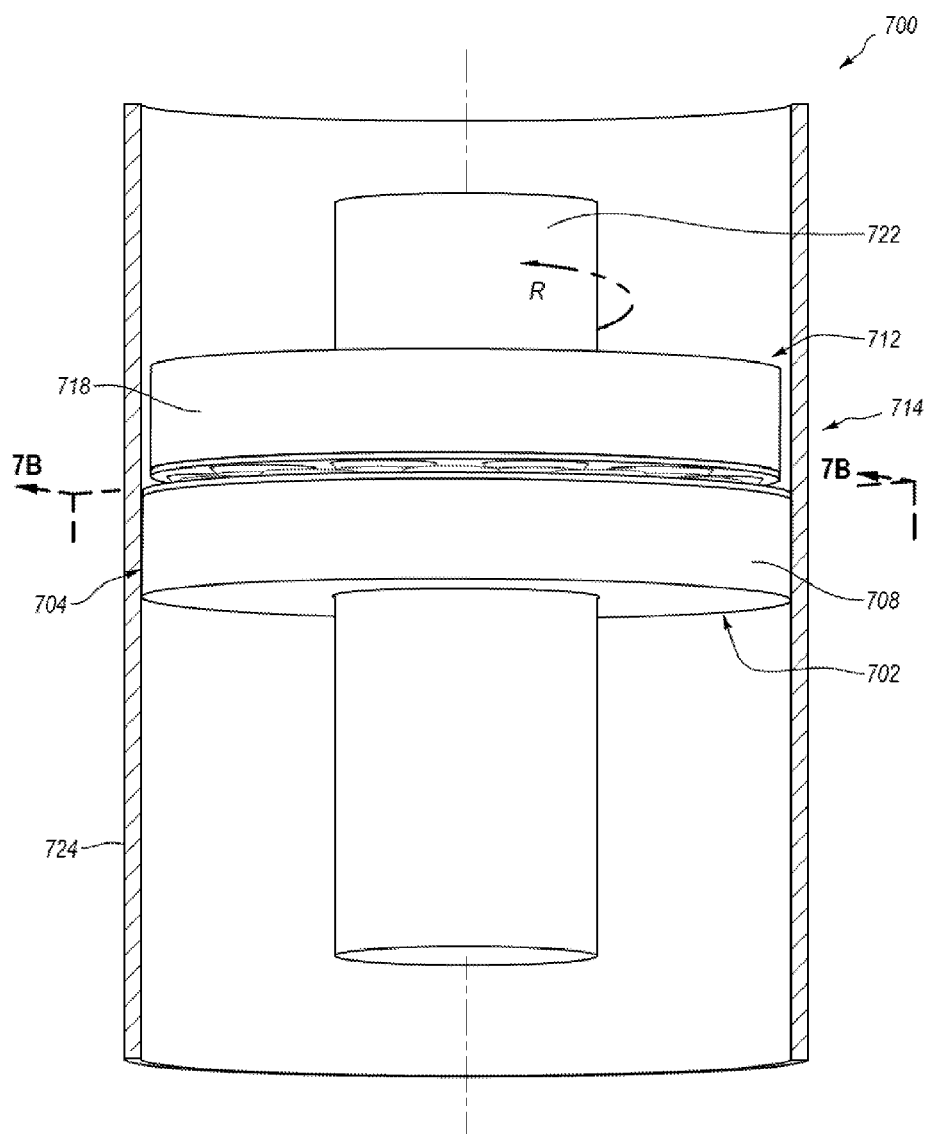
FIG. 7A is an isometric view of a thrust-bearing apparatus that may employ any of the disclosed thrust-bearing assemblies according to an embodiment.
Figure 7B:
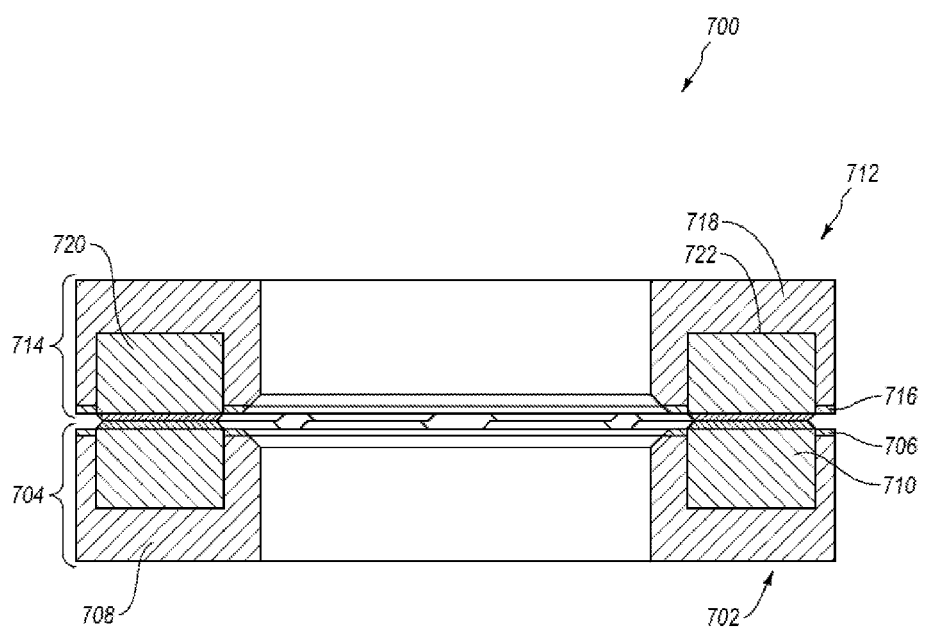
FIG. 7B is a cross-sectional view of the thrust-bearing apparatus shown in FIG. 7A take along line 7B-7B.

Any of the thrust-bearing assembly embodiments disclosed herein may be employed in a thrust-bearing apparatus. For example, FIGS. 7A and 7B illustrate a thrust-bearing apparatus 700 according to an embodiment. The thrust-bearing apparatus 700 may include a stator 702 as shown in FIG. 7A. The stator 702 may include a support ring structure 704 including an erosion resistant coating 706 (shown in FIG. 7B) formed on a support ring 708. A plurality of superhard bearing elements 710 are mounted to the support ring 708. The thrust-bearing apparatus 700 further may include a rotor 712. The rotor 712 may include a support ring structure 714 including an erosion resistant coating 716 (shown in FIG. 7B) formed on a support ring 718 and a plurality of superhard bearing elements 720 mounted or otherwise attached within a corresponding plurality of recesses 722 of the support ring 718. Of course, the stator 702 or rotor 712 may be configured according to any of the other embodiments disclosed herein. In an embodiment, only one of the stator 702 or rotor 712 may include erosion resistant regions, erosion resistant inserts, or erosion resistant coatings as described herein. For example, in an embodiment only one of the rotor 712 or stator 702 may include the erosion resistant coating 706 and the erosion resistant coating 716. It is noted that in other embodiments, the rotor or stator may be configured as any of the previously described embodiments of thrust-bearing assemblies.

As shown in FIG. 7A, a shaft 722 may be coupled to the support ring 718 and operably coupled to an apparatus capable of rotating the shaft 722 in a direction R (or in a generally opposite direction), such as a downhole motor. For example, the shaft 722 may extend through and may be secured to the support ring 718 of the rotor 712 by press-fitting or threadly coupling the shaft 722 to the support ring 718 or another suitable technique. A housing 724 may be secured to a support ring 708 of the stator 702 and may extend circumferentially about the shaft 722 and the rotor 712.

Figure 8A:
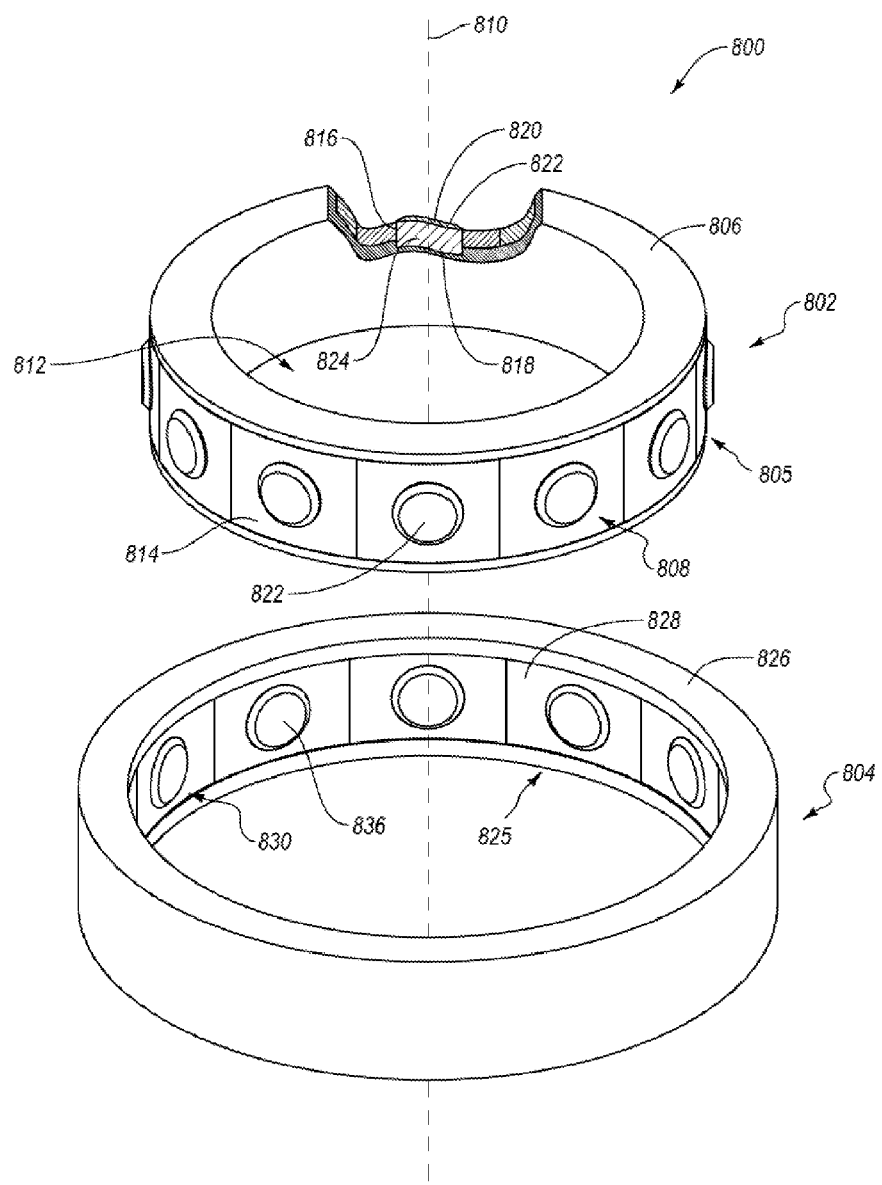
FIG. 8A is an exploded isometric view of a radial bearing apparatus including a cutaway view of an inner radial bearing assembly according to an embodiment.
Figure 8B:
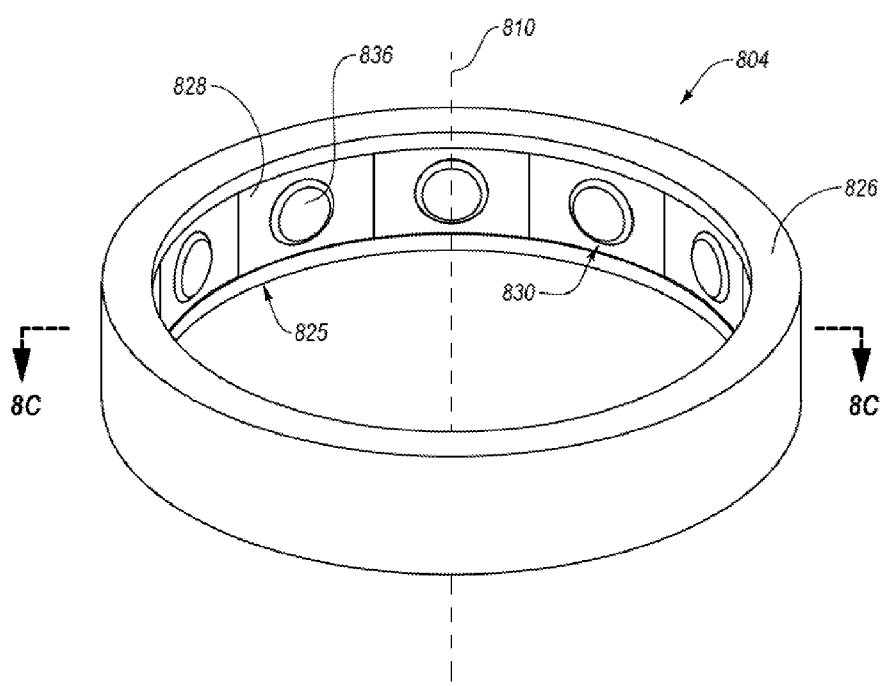
FIG. 8B is an isometric view of the outer radial bearing assembly shown in FIG. 8A.
Figure 8C:
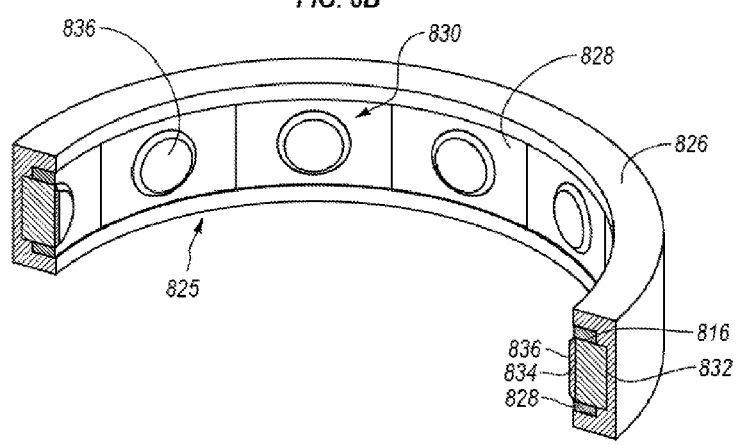
FIG. 8C is an isometric cutaway view of the outer radial bearing assembly taken along line 8C-8C of the radial bearing assembly shown in FIGS. 8A and 8B.

The concepts used in the thrust-bearing assemblies and apparatuses described above may also be employed in radial bearing assemblies and apparatuses. For example, FIGS. 8A-8C are isometric exploded cutaway, isometric, and isometric cutaway views, respectively, of a radial bearing apparatus 800 according to an embodiment. The radial bearing apparatus 800 may include a first radial bearing assembly 802 (i.e., an inner race) and a second radial bearing assembly 804 (i.e., an outer race). The first radial bearing assembly 802 may be configured as a rotor and may include a support ring structure 805 including a support ring 806 and a plurality of superhard bearing elements 808 extending about a rotation axis 810. The support ring 806 may include an inner peripheral surface defining a central opening 812.

As shown in FIG. 8A, the support ring structure 805 includes the support ring 806 and may be configured with an annular slot 818 to carry a plurality of inserts 814 that may enhance the erosion resistance of the support ring 806. The plurality of inserts 814 may comprise a carbide, a superhard material, a metal carbide (e.g., tungsten carbide, niobium carbide, molybdenum carbide, vanadium carbide, titanium carbide, or combinations thereof), a cemented carbide (e.g., tungsten carbide, niobium carbide, molybdenum carbide, boron carbide, silicon carbide, vanadium carbide, titanium carbide, or combinations thereof cemented with cobalt, iron, nickel, or alloys thereof), diamond, boron nitride, combinations of the foregoing, or other suitable erosion resistant material. The plurality of inserts 814 may be pre-machined to tolerances and mounted in the annular slot 818 of the support ring 806 via brazing, press-fitting, threadly attaching, fastening with a fastener, combinations of the foregoing, or another suitable technique. Each of the plurality of inserts 814 may include a hole 816 (shown in FIG. 8C) for receiving a corresponding one of the superhard bearing elements 808. According to various embodiments, the inserts 814 may exhibit various suitable shapes and configurations. For example, the inserts 814 may exhibit a round, square, polygonal, oval, rectangular, or other suitable shape that may include a through or blind hole for receiving a superhard bearing element 808.

As illustrated in FIG. 8A, the superhard bearing elements 808 may be distributed circumferentially about the rotation axis 810 in corresponding holes 816 and within the annular slot 818 formed in the support ring 806 of the support ring structure 805 and arranged in a single row. In other embodiments, the superhard bearing elements 808 may be circumferentially distributed in two rows, three rows, four rows, or any other number of rows. At least one, some of, or each superhard bearing element 808 may include a superhard table 820 (shown in FIG. 8A) including a convexly-curved bearing surface 822 (e.g., curved to lie on an imaginary cylindrical surface). Each superhard table 820 may be bonded or attached to a corresponding substrate 824. The superhard bearing elements 808 may have generally cylindrical shaped bodies and may be made from any of the materials discussed above for the superhard bearing elements 110, 206, 510 or 610. In other embodiments, the superhard bearing elements 808 may have different shapes and/or sizes. For example, one or more of the superhard bearing surfaces 822 may have a generally rounded rectangular shaped surface, a generally elliptical shaped surface, a generally wedge shaped surface, a generally polygonal shaped surface, or any other suitable shaped surface and/or at least one of the superhard bearing elements 808 may be sized larger than another one of the superhard bearing elements 808.

Figure 8D:
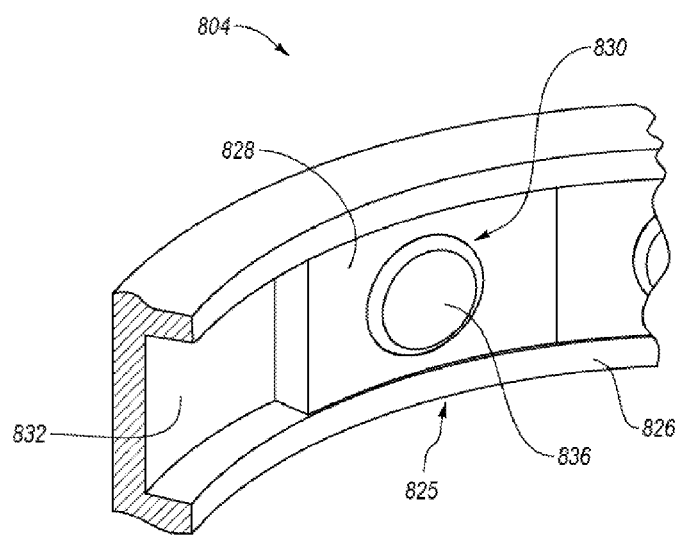
FIGS. 8D and 8E are isometric views of the outer radial bearing assembly and an insert, respectively, shown in FIGS. 8A-8C, according to an embodiment.
Figure 8E:
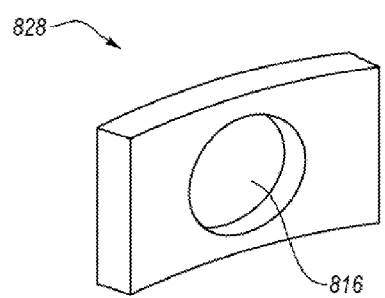

The second radial bearing assembly 804 may be configured as a stator that extends about and receives the first radial bearing assembly 802 (i.e., rotor). The second radial bearing assembly 804 may be generally configured similar to the first radial bearing assembly 802 or any other radial bearing assembly disclosed herein. For example, the second radial bearing assembly 804 may include a support ring structure 825 comprising a support ring 826 including an annular slot 832 (FIG. 8C), a plurality of inserts 828 formed from any of the materials disclosed herein for the inserts 814, and a plurality of superhard bearing elements 830. The plurality of inserts 828 and the superhard bearing elements 830 may be distributed circumferentially about the rotation axis 810 within the annular slot 832 (shown in FIGS. 8C and 8D) formed in the support ring 826. As illustrated in FIGS. 8C and 8E, each of the plurality of inserts 828 may include a hole 816. Each of the plurality of inserts 828 receives a corresponding one of the plurality of superhard bearing elements 830.

The positioning of the superhard bearing elements 830 into the holes 816 of the inserts 828 may provide erosion resistance regions laterally surrounding each of the superhard bearing elements 830. The superhard bearing elements 830 may be machined to tolerances and mounted in the holes 816 of the inserts 828 and annular slot 832 of the support ring 826 and/or attached to the support ring 826 of the support ring structure 825 according to any of the embodiments disclosed herein.

At least one of, some of, or each superhard bearing element 830 may include a superhard table 834 (shown in FIG. 8C) including a concavely-curved bearing surface 836 curved to correspond to the convexly-curved bearing surfaces 822 of the superhard bearing elements 808. Each of the superhard bearing elements 830 including the concavely curved bearing surface 836 may be oriented to engage the convexly-curved bearing surfaces 822 of the first bearing assembly 802 during operation. Similar to the superhard bearing elements 808, the superhard bearing elements 830 may have generally cylindrical shaped bodies and may be made from any of the materials and structures discussed above for any of the superhard bearing elements disclosed herein.

While the superhard bearing elements 830 are shown configured similarly to one another and the superhard bearing elements 808, in other embodiments, the superhard bearing elements 830 may have shapes and/or sizes that vary from one another and/or the superhard bearing elements 808. For example, one or more of the superhard bearing elements 830 may have any solid geometry such as a generally cubic geometry, a generally polyhedron geometry, or any generally plane geometry that has a thickness or depth. For example, a bearing surface 836 of a superhard bearing element 830 may have a generally rectangular shape, a generally elliptical shape, a generally wedge shape, a generally polygonal shape, a generally oval shape, or any other suitable geometry. In other embodiments, at least one of the superhard bearing elements 808 may have a generally rectangular shape and at least one of the superhard bearing 830 elements may have a generally elliptical shape. In yet other embodiments, at least one of the superhard bearing elements 830 may be sized larger than at least one of the superhard bearing elements 808.

In an embodiment, a shaft or spindle (not shown) may extend through the opening 812 and may be secured to the first radial bearing assembly 802, threadly coupling the shaft or spindle to the first radial bearing assembly 802, or another suitable technique. A housing (not shown) may also be secured to the second radial bearing assembly 804 using similar techniques. While the first radial bearing assembly 802 is shown configured as the rotor and the second radial bearing assembly 804 is shown configured as the stator, in other embodiments, the first radial bearing assembly 802 may be configured as the stator and the second radial bearing assembly 804 may be configured as the rotor.

Figure 9A:
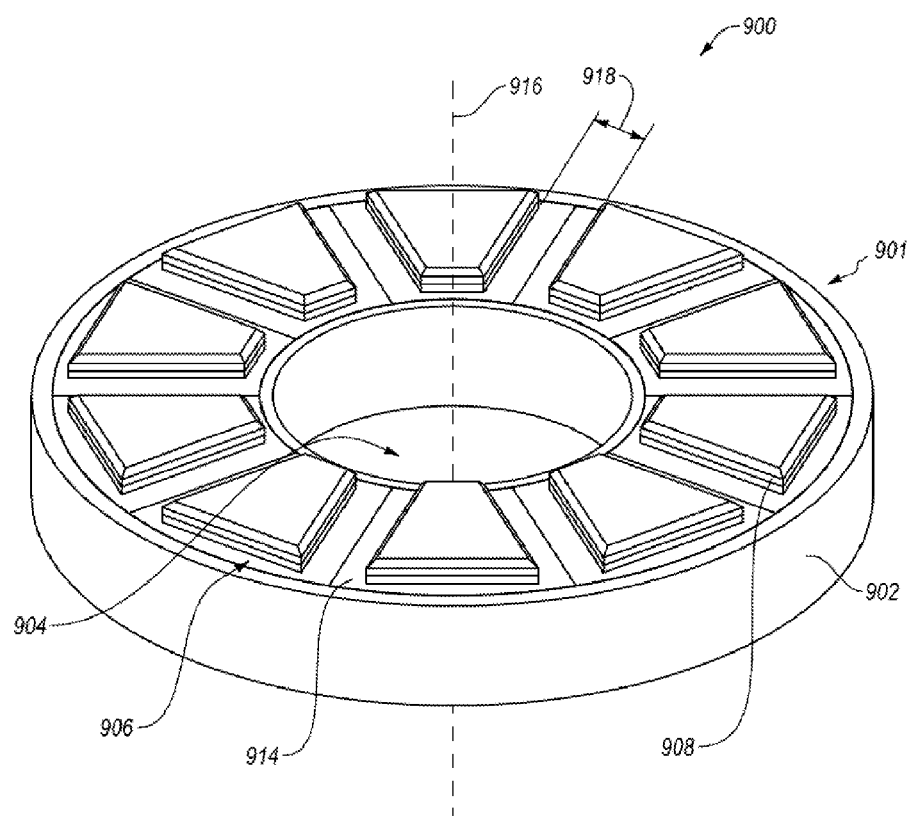
FIG. 9A is an isometric view of a thrust-bearing assembly according to an embodiment.
Figure 9B:
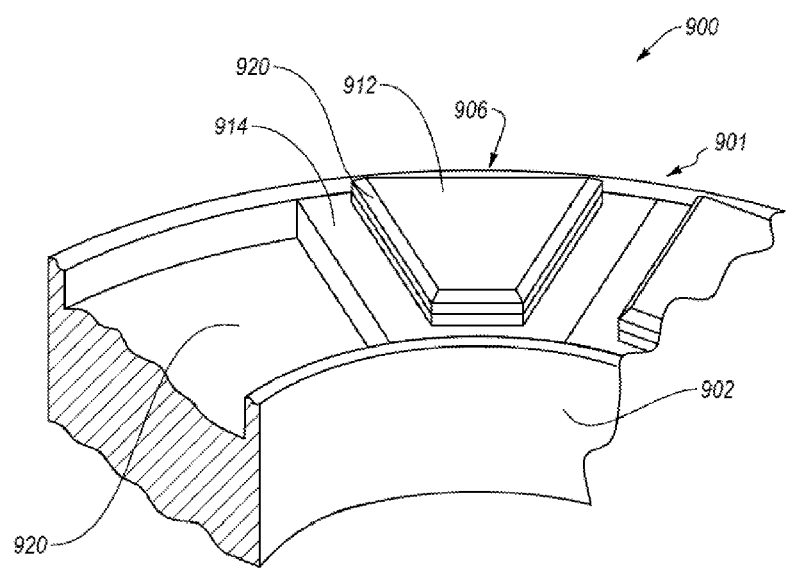
FIGS. 9B and 9C are isometric views of the thrust-bearing assembly and an insert, respectively, shown in FIG. 9A, according to an embodiment.

FIGS. 9A and 9B are isometric and isometric cutaway views, respectively, of a thrust-bearing assembly 900 according to an embodiment. The thrust-bearing assembly 900 may form a stator or a rotor of a thrust-bearing apparatus such as the thrust-bearing apparatus 700 shown in FIGS. 7A and 7B. As shown in FIGS. 9A and 9B, the thrust-bearing assembly 900 may include a support ring structure 901 including a support ring 902 defining an opening 904 through which a shaft (not shown) of, for example, a downhole drilling motor may extend. The support ring 902 may be made from a variety of different materials. For example, the support ring 902 may comprise a metal, an alloy steel, a metal alloy, carbon steel, a stainless steel, tungsten carbide, any other suitable conductive or non-conductive material, combinations of the foregoing, or any material disclosed herein.

The thrust-bearing assembly 900 may include a plurality of superhard bearing elements 906. Each of the plurality of superhard bearing elements 906 may comprise a superhard compact such as a polycrystalline diamond compact. In an embodiment, one or more of the superhard bearing elements 906 may have a general wedge shape. In other embodiments, one or more of the superhard bearing elements 906 may have any solid geometry such as a generally cubic geometry, a generally polyhedron geometry, or any generally plane geometry that has a thickness or depth. For example, a bearing surface of the superhard bearing element 906 may have a generally 2D rectangular shape, a generally cylindrical shape, a generally oval shape, a generally polygonal shape, or any other suitable geometry.

Figure 9C:
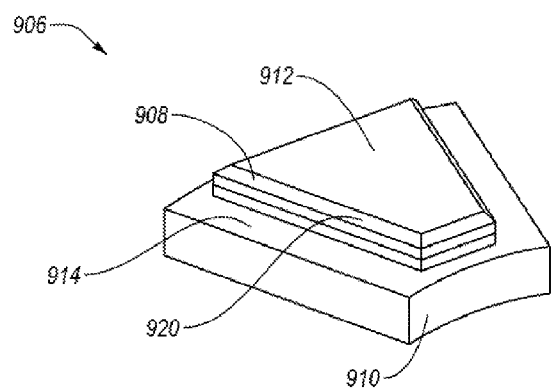
Figure 9D:
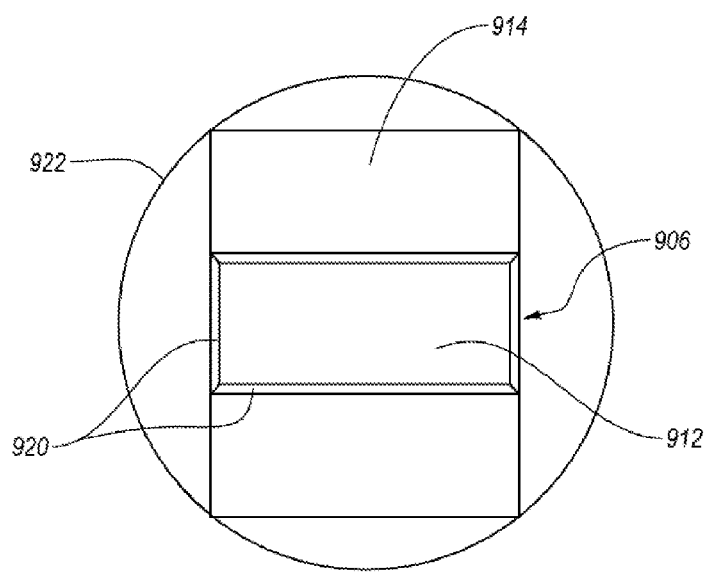
FIG. 9D is a top plan view illustrating the beginning stage of manufacture of the superhard bearing elements and erosion resistant regions shown in FIGS. 9A-9C according to an embodiment.
Figure 9E:
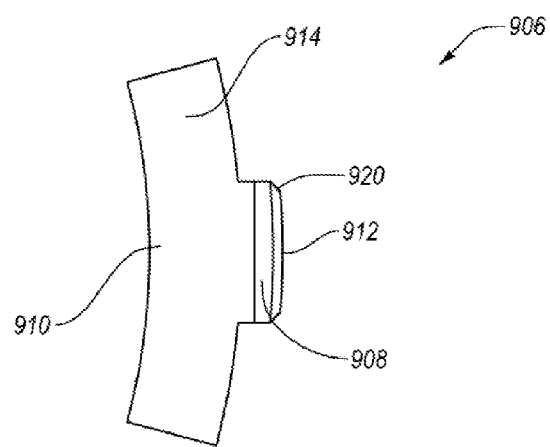
FIG. 9E is a side elevation view of the superhard bearing element and erosion resistant regions shown in FIGS. 9A-9D.

The superhard bearing elements 906 may include a superhard table 908 bonded to a substrate 910, and a bearing surface 912 of the superhard table 908 (shown in FIG. 9C and FIG. 9E). The substrate 910 may extend at least partially laterally about one of the plurality of superhard bearing elements 906 to form lateral extensions 914. For example, as shown in FIG. 9A-9C, the lateral extensions 914 extend laterally about each of the plurality of superhard bearing elements 906. The lateral extensions 914 may be comprised of a carbide, a superhard material, a metal carbide (e.g., tungsten carbide, niobium carbide, molybdenum carbide, vanadium carbide, titanium carbide, or combinations thereof), a cemented carbide (e.g., tungsten carbide, niobium carbide, molybdenum carbide, diamond, boron carbide, silicon carbide, boron nitride, vanadium carbide, titanium carbide, or combinations thereof cemented with cobalt, iron, nickel, or alloys thereof), or other suitable erosion resistant material to provide for greater erosion resistance of the support ring 902. For example, the lateral extensions 914 may provide enhanced erosion resistance of the support ring 902 during operation of the thrust-bearing assembly 900.

The superhard bearing elements 906 are illustrated in FIG. 9A being distributed circumferentially about a thrust axis 916 along which a thrust force may be generally directed during use. The superhard bearing elements 906 may be circumferentially distributed about the thrust axis 916 in one row, two rows, three rows, or any number of suitable rows. As shown, gaps 918 may be located between adjacent ones of the superhard bearing elements 906. In an embodiment, at least one of, some of, or all of the gaps 918 may exhibit width of about 0.00020 inches to 0.500 inches, such as about 0.10 inches to about 0.3 inches, about 0.10 inches to about 0.4 inches, about 0.00040 inches to 0.0010 inches, or about 0.00040 inches to 0.080 inches. In other embodiments, the gaps 918 may have widths that are relatively larger or smaller. In other embodiments, the gaps 918 may substantially be zero. In other embodiments, one or more of the gaps 918 may have different widths. For example, one pair of adjacent ones of the superhard bearing elements 906 may be closer together than another pair of adjacent ones of the superhard bearing elements 906.

As shown in FIG. 9B, the support ring structure 901 including the support ring 902 carries the plurality of superhard bearing elements 906, with each of the plurality of superhard bearing elements 906 including the two lateral extensions 914, one lateral extension 914 on each side of each of the plurality of superhard bearing elements 906.

Each of the plurality of superhard bearing elements 906 and corresponding extensions 914 may be partially disposed within an annular slot 920 (shown in FIG. 9B) of the support ring 902 of the support ring structure 901. The positioning of the superhard bearing elements 906 and corresponding lateral extensions 914 into the annular slot 920 of the support ring 902 may provide erosion resistant regions laterally surrounding each of the superhard bearing elements 906. The superhard bearing elements 906 and corresponding extensions 914 may be pre-machined to tolerances and mounted into the annular slot 920 of the support ring 902 of the support ring structure 901 as described with reference to superhard bearing elements 110 or as otherwise described herein. Bearing surfaces 912 may be planarized (e.g., by lapping and/or grinding) and/or positioned so that the bearing surfaces 912 are substantially coplanar. Optionally, one or more of the superhard bearing elements 906 may exhibit a peripherally extending edge chamfer 920 (shown in FIG. 9B-9E). However, in other embodiments, the edge chamfer 920 may be omitted.

According to an embodiment, the plurality of superhard bearing elements 906 and corresponding extensions 914 may be cut from a generally cylindrical superhard compact. For example, as shown in FIG. 9D, the superhard table 908 of a cylindrical superhard compact 922 may be cut and shaped using wire electrical discharge machining ("EDM"), laser machining, or any other suitable method so that portions of the substrate 910 are exposed that define the lateral extensions 914.

Figure 10:
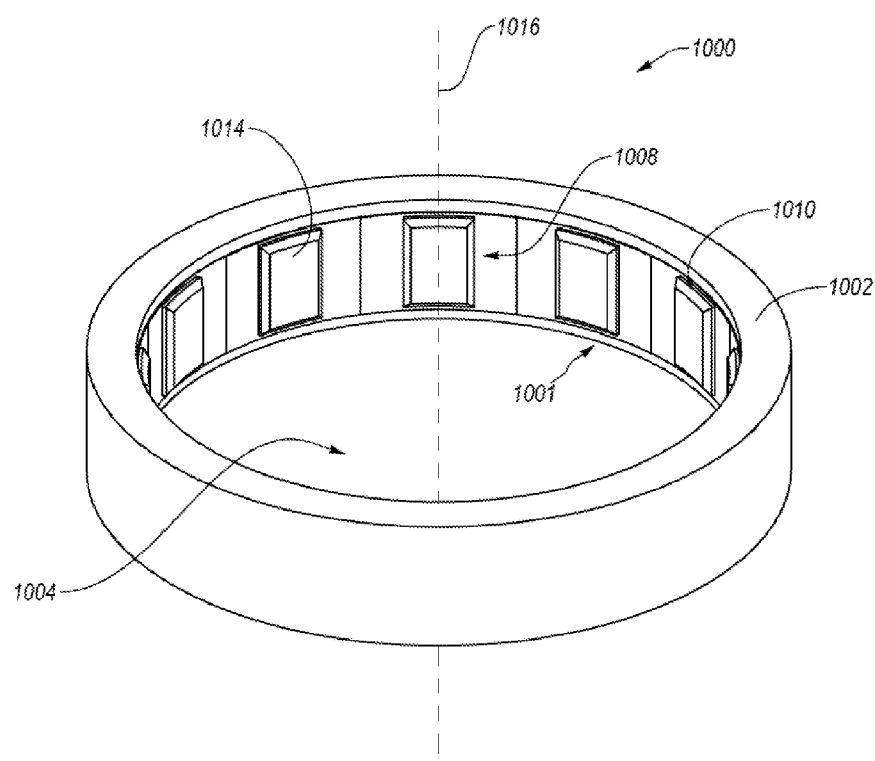
FIG. 10 is an isometric view of a radial bearing assembly according to an embodiment.

The concepts used in the thrust-bearing assemblies and apparatuses described above may also be employed in radial bearing assemblies and apparatuses. FIG. 10 is an isometric view illustrating a radial bearing assembly 1000 according to an embodiment. The radial bearing assembly 1000 may include a support ring structure 1001 including a support ring 1002 extending about a rotation axis 1016. The support ring 1002 may include a central opening 1004 that is capable of receiving, for example, an inner support ring or inner race. A plurality of superhard bearing elements 1008 may be distributed circumferentially about the rotation axis 1016. Each superhard bearing element 1008 may include a superhard table 1010 including a concavely-curved bearing surface 1014 (e.g., curved to lie on an imaginary cylindrical surface). Each superhard table 1010 may be bonded or attached to a corresponding substrate. The superhard bearing elements 1008 may have a generally rectangular shape and each made from any of the materials discussed above for the superhard bearing elements 110. In other embodiments, the superhard bearing elements 1008 may have a non-rectangular shape, a general wedge-like shape, a general cylindrical shape, a generally polygonal shape, or any other suitable geometry. As illustrated in FIG. 10, the superhard bearing elements 1008 may be distributed circumferentially about the rotation axis 1016 in an annular slot (not shown) formed in the support ring 1002 of the support ring structure 1001 and arranged in a single row. In other embodiments, the superhard bearing elements 1008 may be circumferentially distributed in two rows, three rows, four rows, or any number of rows.

The radial bearing assembly 1000 described above may be used as a rotor or stator in a bearing apparatus that may be employed in a variety of mechanical applications. For example, so-called "rotary cone" rotary drill bits, pumps, transmissions or turbines may benefit from a radial bearing apparatus discussed herein.

Figure 11:
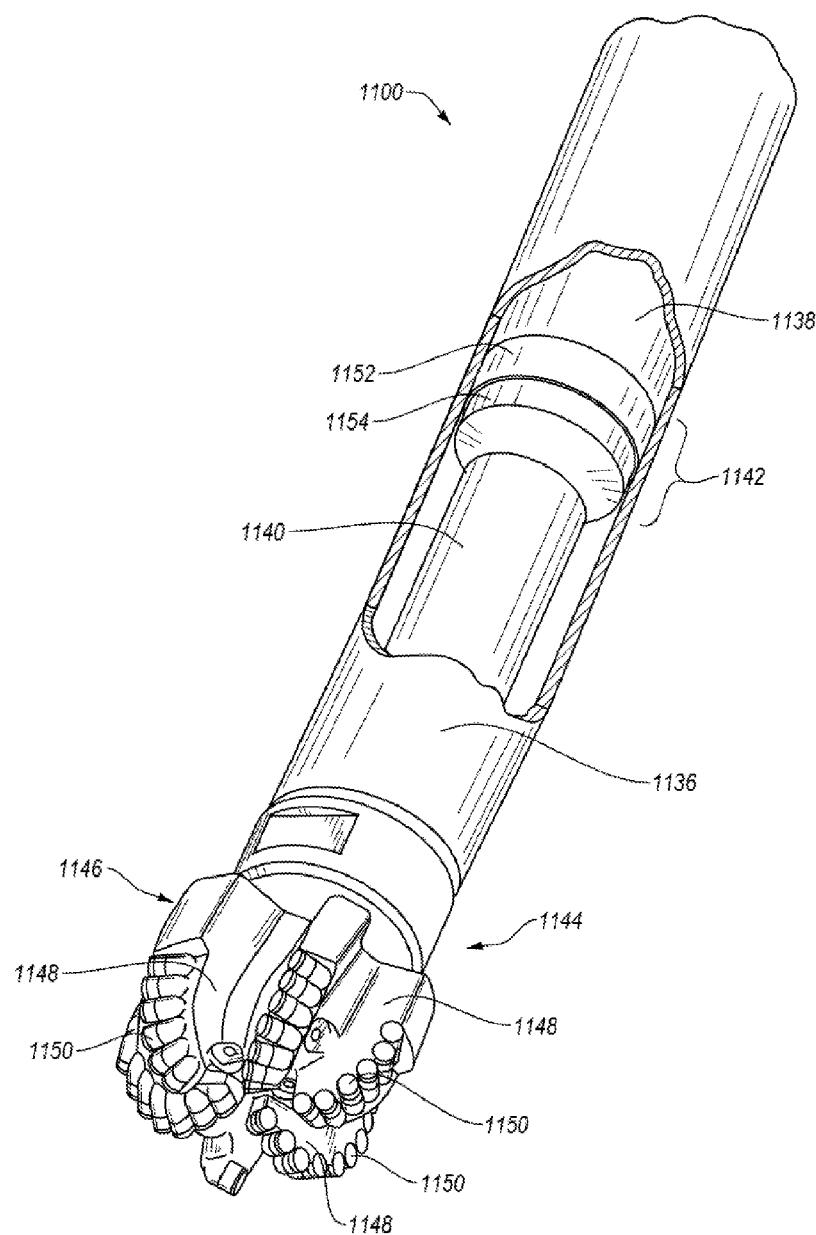
FIG. 11 is a schematic isometric cutaway view of a subterranean drilling system including a thrust-bearing apparatus utilizing any of the disclosed bearing assemblies according to various embodiments.

FIG. 11 is a schematic isometric cutaway view of a subterranean drilling system 1100 according to an embodiment. The subterranean drilling system 1100 may include a housing 1136 enclosing a downhole drilling motor 1138 (i.e., a motor, turbine, or any other device capable of rotating an output shaft) that may be operably connected to an output shaft 1140. A thrust-bearing apparatus 1142 may be operably coupled to the downhole drilling motor 1138. The thrust-bearing apparatus 1142 may be configured as any of the previously described thrust-bearing apparatus embodiments. A rotary drill bit 1144 may be configured to engage a subterranean formation and drill a borehole and may be connected to the output shaft 1140. The rotary drill bit 1144 is shown comprising a bit body 1146 that includes radially-extending and longitudinally-extending blades 1148 with a plurality of polycrystalline diamond compacts 1150 secured to the blades 1148. However, other embodiments may utilize different types of rotary drill bits, such as so-called core bits, or roller-cone bits. As the borehole is drilled, pipe sections may be connected to the subterranean drilling system 1100 to form a drill string capable of progressively drilling the borehole to a greater depth within the earth.

The thrust-bearing apparatus 1142 may include a stator 1152 that does not rotate and a rotor 1154 that may be attached to the output shaft 1140 and rotates with the output shaft 1140. As discussed above, the thrust-bearing apparatus 1142 may be configured as any of the embodiments disclosed herein. For example, the stator 1152 and the rotor 1154 may include a plurality of circumferentially-distributed superhard bearing elements (not shown) similar to those shown and described in relation to FIG. 1. In operation, lubricating fluid may be circulated through the downhole drilling motor 1138 to generate torque and rotate the output shaft 1140 and the rotary drill bit 1144 attached thereto so that a borehole may be drilled. A portion of the lubricating fluid may also be used to lubricate opposing bearing surfaces of the stator 1152 and the rotor 1154.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
   a plurality of superhard bearing elements distributed circumferentially about an axis, each of the plurality of superhard bearing elements including a superhard bearing surface, each of the plurality of superhard bearing elements exhibiting a generally uniform transverse cross-sectional shape along a height of each of the plurality of superhard bearing elements; and
   a support ring structure including a support ring that carries the plurality of superhard bearing elements and at least one erosion resistant region disposed on the support ring, the support ring defining a plurality of recesses extending partially through the support ring, each of the plurality of superhard bearing elements mounted in a corresponding one of the plurality of recesses, the at least one erosion-resistant region exhibiting a higher erosion resistance than a region of the support ring;
   wherein the at least one erosion-resistant region includes an erosion resistant coating covering a portion of the support ring, the erosion resistant coating is deposited on the portion of the support ring circumferentially between the superhard bearing elements and spaced from at least one adjacent superhard bearing element of the plurality of superhard bearing elements by about 5 µm to about 6.4 mm.

2. The bearing assembly of claim 1 wherein the erosion resistant coating is deposited by at least one of laser-deposition, chemical vapor deposition, physical vapor deposition, thermal spray deposition, or plasma-enhanced chemical vapor deposition.

3. The bearing assembly of claim 1 wherein the at least one erosion resistant region includes a superhard material.

4. The bearing assembly of claim 3 wherein the superhard material includes at least one of a metal carbide or a cemented carbide.

5. The bearing assembly of claim 1 wherein the plurality of superhard bearing elements are brazed to the support ring.

6. The bearing assembly of claim 1 wherein the axis is at least one of a rotation axis or a thrust axis.

7. The bearing assembly of claim 1 wherein each of the plurality of superhard bearing elements includes a polycrystalline diamond compact.

8. The bearing assembly of claim 1 wherein the support ring and the at least one erosion-resistant region are integral with each other.

9. The bearing assembly of claim 1 wherein the support ring includes steel and the at least one erosion-resistant region includes carbide material.

10. The bearing assembly of claim 1 wherein the support ring includes steel and the at least one erosion-resistant region includes carbide material.

11. The bearing assembly of claim 1, wherein the support ring is formed from a single piece.

12. The bearing assembly of claim 1 wherein the erosion resistant coating is deposited by at least one of a laser-applied process or a high-velocity oxygen fuel thermal spray process.

13. A bearing apparatus, comprising:
a first bearing assembly including:
a plurality of first superhard bearing elements distributed circumferentially about an axis, each of the plurality of first superhard bearing elements including a first superhard bearing surface, each of the plurality of first superhard bearing elements exhibiting a generally uniform traverse cross-sectional shape along a height of each of the plurality of first superhard bearing elements; and
a support ring structure including a support ring that carries the plurality of first superhard bearing elements and at least one erosion resistant region disposed on the support ring, the support ring defining a plurality of recesses extending partially through the support ring, each of the plurality of superhard bearing elements mounted in a corresponding one of the plurality of recesses, the at least one erosion-resistant region exhibiting a higher erosion resistance than a region of the support ring;
wherein the at least one erosion-resistant region includes an erosion resistant coating covering a portion of the support ring, the erosion resistant coating is deposited on the portion of the support ring circumferentially between the superhard bearing elements and spaced from at least one adjacent superhard bearing element of the plurality of first superhard bearing elements by about 5 μm to about 6.4 mm;
a second bearing assembly including a plurality of second superhard bearing elements, each of the second superhard bearing elements including a second superhard bearing surface oriented to engage the first superhard bearing surfaces of the first bearing assembly during operation.

14. The bearing apparatus of claim 13 wherein the at least one erosion resistant region includes a superhard material.

15. The bearing assembly of claim 13, wherein the support ring is formed from a single piece.

16. A method of fabricating a bearing assembly, the method comprising:
providing a support ring including a plurality of recesses for receiving a plurality of superhard bearing elements therein, each of the plurality of recesses extending partially through the support ring and defined by at least one recess surface, the plurality of recesses being distributed circumferentially about an axis;
depositing an erosion resistant coating onto a portion of the support ring between each of the plurality of recesses, the erosion resistant coating is deposited on the portion of the support ring circumferentially between the superhard bearing elements and spaced from at least one adjacent superhard bearing element of the plurality of superhard bearing elements by about 5 μm to about 6.4 mm; and
mounting each of the plurality of superhard bearing elements in a corresponding one of the plurality of recesses of the support ring, each of the plurality of superhard bearing elements exhibiting a generally uniform transverse cross-sectional shape along a height of each of the plurality of bearing elements.

17. The method of claim 16 wherein depositing an erosion resistant coating onto at least a portion of the support ring includes depositing the erosion resistant coating by at least one of laser-deposition, chemical vapor deposition, physical vapor deposition, thermal spray deposition, plasma-enhanced chemical vapor deposition, or high-velocity oxygen fuel thermal spray process.

18. The method of claim 16 wherein mounting each of the plurality of superhard bearing elements is completed after depositing the erosion resistant coating onto the at least a portion of the support ring.

* * * * *